(12) United States Patent
Ishibashi

(10) Patent No.: US 8,886,343 B2
(45) Date of Patent: Nov. 11, 2014

(54) SOUND PROCESSING SYSTEM

(75) Inventor: Toshiaki Ishibashi, Fukuroi (JP)

(73) Assignee: Yamaha Corporation (JP)

( * ) Notice: Subject to any disclaimer, the term of this patent is extended or adjusted under 35 U.S.C. 154(b) by 1299 days.

(21) Appl. No.: 12/441,464

(22) PCT Filed: Oct. 3, 2008

(86) PCT No.: PCT/JP2008/068078
§ 371 (c)(1),
(2), (4) Date: Mar. 16, 2009

(87) PCT Pub. No.: WO2009/044872
PCT Pub. Date: Apr. 9, 2009

(65) Prior Publication Data
US 2010/0172514 A1 Jul. 8, 2010

(30) Foreign Application Priority Data
Oct. 5, 2007 (JP) .................................. 2007-261897

(51) Int. Cl.
*G06F 17/00* (2006.01)
*H04R 3/00* (2006.01)
*H04R 1/40* (2006.01)
*H04M 3/00* (2006.01)
*H04M 3/56* (2006.01)

(52) U.S. Cl.
CPC ................ *H04R 3/005* (2013.01); *H04R 1/406* (2013.01); *H04M 3/002* (2013.01); *H04R 1/403* (2013.01); *H04M 3/56* (2013.01)
USPC .......................................................... 700/94

(58) Field of Classification Search
USPC .......................................................... 700/94
See application file for complete search history.

(56) References Cited

U.S. PATENT DOCUMENTS 5,268,904 A 12/1993 Umeda
7,099,922 B2 * 8/2006 Pospesel et al. .............. 709/208
(Continued)

FOREIGN PATENT DOCUMENTS

EP 1703773 A2 9/2006
JP 05183654 A 7/1993
(Continued)

OTHER PUBLICATIONS
Universal Serial Bus Specification Rev. 2.0 (Apr. 27, 2000), pp. i, ii, 65-83, 204, 205.*
(Continued)

*Primary Examiner* — Paul McCord
(74) *Attorney, Agent, or Firm* — Rossi, Kimms & McDowell LLP

(57) ABSTRACT

A sound enhancement system is configured such that sound emitting and collecting apparatuses 100 to 105 are connected to each other via a transmission line LT. The sound emitting and collecting apparatuses 100 to 105 are grouped into a master and a slave. The master sound emitting and collecting apparatus 100 generates a reference clock signal to be supplied to slave sound emitting and collecting apparatuses 101 to 105. The slave sound emitting and collecting apparatuses 101 to 105 form a sound collection beam signal in synchronization with the reference clock signal, and then output the resulting signal to the master sound emitting and collecting apparatus 100 without performing acoustic coupling suppressing process. The master sound emitting and collecting apparatus 100 collectively executes the acoustic coupling suppressing process to each sound collection beam signal to produce a sound emitting signal. The master sound emitting and collecting apparatus 100 outputs the sound emitting signal to the slave sound emitting and collecting apparatuses 101 to 105, each of which emits sound based on the sound emitting signal.

11 Claims, 15 Drawing Sheets

(56) References Cited

U.S. PATENT DOCUMENTS

| | | | |
|---|---|---|---|
| 7,996,588 B2* | 8/2011 | Subbiah et al. | 710/72 |
| 2002/0099772 A1* | 7/2002 | Deshpande et al. | 709/204 |
| 2004/0052209 A1* | 3/2004 | Ortiz | 370/230 |
| 2004/0170284 A1* | 9/2004 | Janse et al. | 381/66 |
| 2004/0234000 A1* | 11/2004 | Page | 375/259 |
| 2005/0062843 A1* | 3/2005 | Bowers et al. | 348/14.08 |
| 2005/0286443 A1* | 12/2005 | McMillen et al. | 370/260 |
| 2006/0210093 A1 | 9/2006 | Ishibashi et al. | |
| 2006/0224620 A1* | 10/2006 | Silverman et al. | 707/104.1 |
| 2006/0280182 A1* | 12/2006 | Williams et al. | 370/394 |
| 2007/0255855 A1* | 11/2007 | Knapp et al. | 709/248 |

FOREIGN PATENT DOCUMENTS

| | | |
|---|---|---|
| JP | 2004072698 A | 3/2004 |
| JP | 2006-211177 A | 8/2006 |
| JP | 2006262416 A | 9/2006 |
| JP | 2007251782 A | 9/2007 |
| WO | 2007058130 A1 | 5/2007 |

OTHER PUBLICATIONS

International Search Report issued in PCT/JP2008/068078 dated Oct. 14, 2008.

* cited by examiner

SOUND PROCESSING SYSTEM

This application is a U.S. National Phase Application of PCT International Application PCT/JP2008/068078 filed on Oct. 3, 2008 which is based on and claims priority from JP 2007-261897 filed on Oct. 5, 2007, the contents of which is incorporated herein in its entirety by reference.

TECHNICAL FIELD

The present invention relates to a sound processing system. More particularly, the invention relates to a sound enhancement system in which a plurality of sound emitting and collecting apparatuses, each having a microphone and a speaker, are placed in a predetermined space such as in the same room to enhance and transmit the collected sound. The invention also relates to a sound communication system which transmits a collected sound to an external sound emitting and collecting apparatus via a network or emits a sound emitting signal from the external sound emitting and collecting apparatus.

BACKGROUND ART

Conventionally, in a case where a number of conferees are present at the same time in a spacious conference room, there have been devised various types of systems which enable all the conferees present to catch the voice of a talker.

For example, a sound enhancement system disclosed in Patent Document 1 is designed to have a plurality of microphones and speakers arrayed in a predetermined pattern on the ceiling of a conference room. This sound enhancement system detects a talker based on the voice of the talker collected by a microphone near the talker, and then adjusts the output of each speaker for emission based on the location of the talker detected.

In the aforementioned sound enhancement system, the speakers and microphones are fixedly installed in the conference room, and thus their specifications cannot be altered once they are installed there. A method for solving such a problem with existing systems may be considered by using a sound emitting and collecting apparatus which can be placed on a table and made portable.

Patent Document 1 JP-A-2006-211177

DISCLOSURE OF THE INVENTION

Problems that the Invention is to Solve

However, the tabletop type sound emitting and collecting apparatus is limited to a certain size in terms of installability and transportability. This may conceivably lead to a system in which a plurality of sound emitting and collecting apparatuses are installed and interconnected to each other by a transmission line. In such a system, all the sound emitting and collecting apparatuses have the same capability, and each sound emitting and collecting apparatus performs individually acoustic coupling suppressing howling canceling and acoustic echo canceling. Such acoustic coupling suppressing involves complicated operational processing, requiring further complicated operational processing when synchronization is to be achieved between each sound emitting and collecting apparatus to collect and emit sounds. Accordingly, each sound emitting and collecting apparatus that constitutes the system must have a high performance, thereby causing an increase in unit price of each sound emitting and collecting apparatus and resulting in the entire system being increased in cost.

It is therefore an object of the present invention to provide at low cost a sound processing system which can best suit its service environment.

Means for Solving the Problems

The present invention relates to a sound processing system. The sound processing system includes a plurality of sound emitting and collecting apparatuses, each of which including a sound collecting section, a sound emitting section, and an acoustic coupling suppressing section, and a transmission line for electrically connecting between the plurality of sound emitting and collecting apparatuses. One of the plurality of sound emitting and collecting apparatuses is set as a master sound emitting and collecting apparatus, and the other apparatus is set as a slave sound emitting and collecting apparatus.

The master sound emitting and collecting apparatus produces a synchronization signal and outputs the synchronization signal to the slave sound emitting and collecting apparatus. The slave sound emitting and collecting apparatus outputs a collection sound signal collected and produced by the sound collecting section of the slave sound emitting and collecting apparatus to the master sound emitting and collecting apparatus in synchronization with the synchronization signal. The master sound emitting and collecting apparatus collectively acquires the collection sound signal from the slave sound emitting and collecting apparatus, and executes acoustic coupling suppressing process to the acquired collection sound signal by the acoustic coupling suppressing section to produce a sound emitting signal and output the sound emitting signal to the slave sound emitting and collecting apparatus. The slave sound emitting and collecting apparatus emits the sound emitting signal, which is inputted by the master sound emitting and collecting apparatus, from the sound emitting section of the slave sound emitting and collecting apparatus.

In this configuration, the master sound emitting and collecting apparatus collectively executes the acoustic coupling suppressing process to the collection sound signal from the slave sound emitting and collecting apparatus without allowing the slave sound emitting and collecting apparatus to execute individually the acoustic coupling suppressing. Here, the acoustic coupling suppressing includes, e.g., howling canceling and acoustic echo canceling. Furthermore, the synchronization signal produced by the master sound emitting and collecting apparatus synchronizes the sound emitting and collecting apparatuses that constitute the system. This allows the sound processing system of the present invention made up of the plurality of sound emitting and collecting apparatuses to operate as if it is one virtual large-scale sound emitting and collecting apparatus. Thus, this virtual large-scale sound emitting and collecting apparatus collects the sound and emits a sound subjected to the acoustic coupling suppressing process.

Furthermore, the slave sound emitting and collecting apparatus emits the sound emitting signal in synchronization with the synchronization signal.

Since this configuration also allows sound to be synchronously emitted as well as collected, it can provide an improved sound emission characteristic for the system as a whole, while including the aforementioned features.

Furthermore, the acoustic coupling suppressing section of the master sound emitting and collecting apparatus mixes acquired collection sound signals which are collectively acquired, and executes the acoustic coupling suppressing process to the mixed combined collection sound signal.

In this configuration, the signal processed by the acoustic coupling suppressing section of the master sound emitting and collecting apparatus is a mixed to a single signal, thus making it possible to perform the acoustic coupling suppressing process even if the apparatus does not have a very high performance. This eliminates the need for providing different performances between the master sound emitting and collecting apparatus and the slave sound emitting and collecting apparatus as one being higher than the other.

Furthermore, the acoustic coupling suppressing section of the master sound emitting and collecting apparatus executes the acoustic coupling suppressing process to each of acquired collection sound signals individually. After that, the acoustic coupling suppressing section of the master sound emitting and collecting apparatus mixes the processed collection sound signals to produce and output the sound emitting signal.

In this configuration, since the acoustic coupling suppressing process is performed for each collection sound signal, high accuracy acoustic coupling suppressing process is performed. This allows for realizing a sound processing system that provides emitted sound of good quality. Here, since the acoustic coupling suppressing process is executed merely by the master sound emitting and collecting apparatus, only the master sound emitting and collecting apparatus has to be provided with high accuracy.

Furthermore, the slave sound emitting and collecting apparatus adds an associated sound collection apparatus ID to the collection sound signal to be output to the master sound emitting and collecting apparatus. the master sound emitting and collecting apparatus executes the acoustic coupling suppressing process to each of the acquired collection sound signal individually and then outputs the sound emitting signals associated with the sound collection apparatus IDs respectively. The slave sound emitting and collecting apparatus performs sound emitting process on the sound emitting signal based on the sound collection apparatus ID.

In this configuration, since the acoustic coupling suppressing process is performed for each collection sound signal, high accuracy acoustic coupling suppressing process is performed. Moreover, the sound emitting signal that has been subjected to the acoustic coupling suppressing process is output individually to the slave sound emitting and collecting apparatus in conjunction with the sound delivery apparatus ID. Accordingly, the slave sound emitting and collecting apparatus can select and emit a sound emitting signal based on the sound delivery apparatus ID. For example, this allows the sound emitting and collecting apparatus collecting a sound to emit a sound emitting signal containing its own collected sound, thereby enhancing the howling suppressing.

Furthermore, the master sound emitting and collecting apparatus executes the acoustic coupling suppressing process using a plurality of collection sound signals including an collection sound signal from the master sound emitting and collecting apparatus and a collection sound signal from the slave sound emitting and collecting apparatus.

This configuration allows for performing the aforementioned acoustic coupling suppressing process even when the signal contains not only the collection sound signal of the slave sound emitting and collecting apparatus but also the collection sound signal of the master sound emitting and collecting apparatus.

Furthermore, the master sound emitting and collecting apparatus outputs the sound emitting signal and emits the sound emitting signal from the sound emitting section of the master sound emitting and collecting apparatus.

This configuration allows the master sound emitting and collecting apparatus to emit sound in the same manner as the slave sound emitting and collecting apparatus.

Furthermore, the master sound emitting and collecting apparatus includes an external network connection terminal and transmits the sound emitting signal from the input and output terminal.

Furthermore, the master sound emitting and collecting apparatus executes the same processing as for the collection sound signal on a network received sound signal received through the external network connection terminal.

In these configurations, the sound emitting signal is transmitted to an externally connected sound emitting and collecting apparatus that is separate from the aforementioned transmission line, and a network received sound signal is received from the externally connected sound emitting and collecting apparatus. This allows for communications with the outside as well as for the aforementioned voice enhancement inside the room. That is, the system serves simultaneously as the sound enhancement system and as the sound communication system.

Effects of the Invention

According to the present invention, the system is realized in a simplified configuration in which a plurality of sound emitting and collecting apparatuses are connected to each other via a transmission line. This makes it possible to construct at low cost an optimal system that fits with its service environment and provide optimal voice enhancement and sound communications.

DESCRIPTION OF REFERENCE NUMERALS

10—Main control section; 11—Communication control section, 12—Sound emitting control section; 13—Sound collection control section; 14—Acoustic coupling suppression section; 15—Manipulation section; 16—Xtal; 100—Master sound emitting and collecting apparatus; 101 to 105—Slave sound emitting and collecting apparatus; 109—Sound emitting and collecting apparatus; 111—Communication signal processing section; 112—Connecting detection section; 113—PLL; 140 and 140A to 140N—Acoustic coupling canceller; 141—Post-processing combining section; 149—Pre-combining section; 301A to 301I and 302A to 302I—Conferee; 501 and 502—Conference room; 900—Network

BEST MODE FOR CARRYING OUT THE INVENTION

Now, a sound processing system according to an embodiment of the present invention will be explained with reference to the accompanying drawings. For example, the sound processing system is used in a sound enhancement system, a sound communication system, and a sound enhancement and sound communication system.

(Sound Enhancement System)

Figure 1:
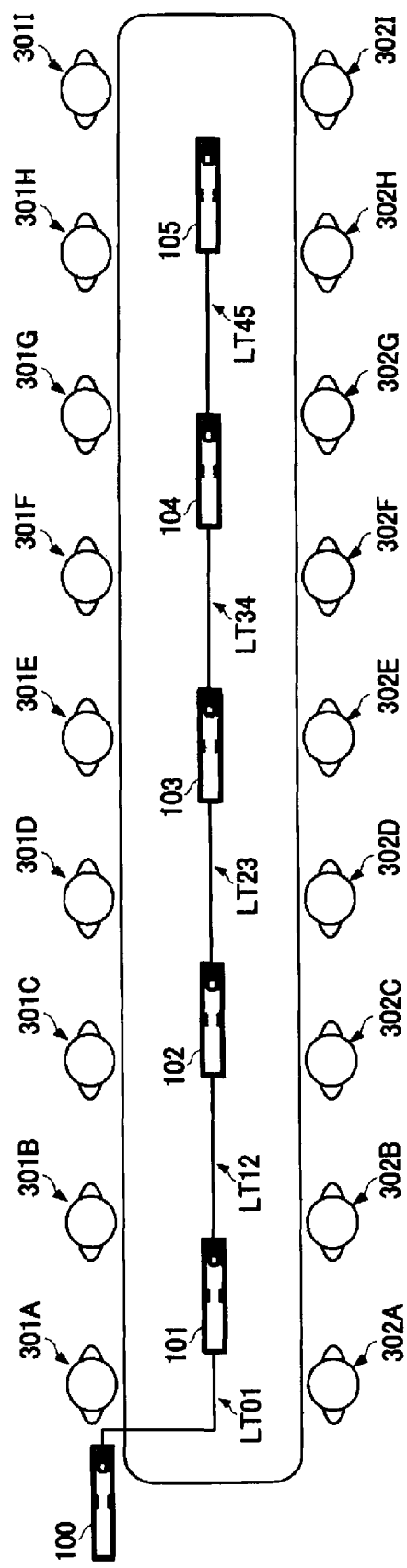
FIG. 1 is a view illustrating the configuration of a sound enhancement system according to an embodiment of the present invention.

FIG. 1 is a block diagram illustrating the system configuration of a sound enhancement system of the present embodiment.

As shown in FIG. 1, the sound enhancement system includes sound emitting and collecting apparatuses 100 to 105 and transmission lines LT01, LT12, LT23, LT34, and LT45. The sound emitting and collecting apparatus 100 and the sound emitting and collecting apparatus 101 are connected to each other with the transmission line LT01. The sound emitting and collecting apparatus 101 and the sound emitting and collecting apparatus 102 are connected to each other with the transmission line LT12. The sound emitting and collecting apparatus 102 and the sound emitting and collecting apparatus 103 are connected to each other with the transmission line LT23. Likewise, the sound emitting and collecting apparatus 103 and the sound emitting and collecting apparatus 104 are connected to each other with the transmission line LT34, and the sound emitting and collecting apparatus 104 and the sound emitting and collecting apparatus 105 are connected to each other with the transmission line LT45. The transmission lines LT01, LT12, LT23, LT34, and LT45 are controlled by each of the sound emitting and collecting apparatuses 100 to 105 using a multi-channel type communication protocol such as mLAN (Trademark), CobraNet, or EtherSound.

The sound emitting and collecting apparatuses 100 to 105 form a long-length housing, and have an array of a plurality of microphones arranged linearly on their sides along the lengthwise direction (hereinafter, referred to as the "longitudinal direction"). The sound emitting and collecting apparatuses 100 to 105 also have a plurality of speakers arranged linearly on their bottom along the lengthwise direction. As such, the sound emitting and collecting apparatuses 100 to 105 serve to emit and collect sound through the sound collection/emission areas excluding those along the lengthwise direction. In addition, in the present embodiment, as shown in FIG. 1, the sound emitting and collecting apparatuses 101 to 105 are disposed on a long-length conference table to collect and emit sound, while the sound emitting and collecting apparatus 100 is disposed near the table to stop the sound collection and emission function and perform only acoustic coupling suppressing. The sound emitting and collecting apparatuses 101 to 105 are linearly disposed in a manner such that the longitudinal direction of the housing is parallel to the longitudinal direction of the table. In those areas perpendicular to the longitudinal direction of the group of these sound emitting and collecting apparatuses 101 to 105, conferees 301A to 301I and 302A to 302I are present.

In the present embodiment, the sound emitting and collecting apparatus 100 is already set as a master sound emitting and collecting apparatus, and the other sound emitting and collecting apparatuses 101 to 105 are set as a slave sound emitting and collecting apparatus. The master sound emitting and collecting apparatus does not collect and emit sound but executes acoustic coupling suppressing. The slave sound emitting and collecting apparatuses collect and emit sound, but do not execute the acoustic coupling suppressing.

The voice of each of the conferees 301A to 301I and 302A to 302I is collected mainly by the nearest sound emitting and collecting apparatus among the slave sound emitting and collecting apparatuses 101 to 105. The collected sound is transmitted to the master sound emitting and collecting apparatus 100, and then the sound emitting signal having been subjected to the acoustic coupling suppressing is transmitted to the slave sound emitting and collecting apparatuses. The slave sound emitting and collecting apparatuses 101 to 105 emit the sound based on the sound emitting signal. The conferees 301A to 301I and 302A to 302I listen to the emitted sound from the nearest sound emitting and collecting apparatus among the sound emitting and collecting apparatuses 101 to 105. This allows any voice from the conferees 301A to 301I and 302A to 302I to be caught by all the conferees. At this time, the slave sound emitting and collecting apparatuses 101 to 105 provide control to sound collection and sound emission in synchronization with the reference clock signal supplied by the master sound emitting and collecting apparatus 100. This allows no temporal shift (such as jitter) to occur in the sound signals between each of the slave sound emitting and collecting apparatuses 101 to 105 when seen from the master sound emitting and collecting apparatus 100. This makes it possible for the sound emitting and collecting apparatuses 100 to 105 to serve as if they are a single sound emitting and collecting apparatus. This in turn allows the acoustic coupling suppressing to work with stability and the acoustic coupling component (in this case, howling component) to be effectively removed. As a result, all the conferees can catch the voice from the talker at a high S/N ratio. As such, only by changing the number of slave sound emitting and collecting apparatuses installed, it is possible to realize a flexible system that fits with its service environment.

Next, description will be given of a specific configuration which implements the aforementioned operations and effects.

Figure 2:
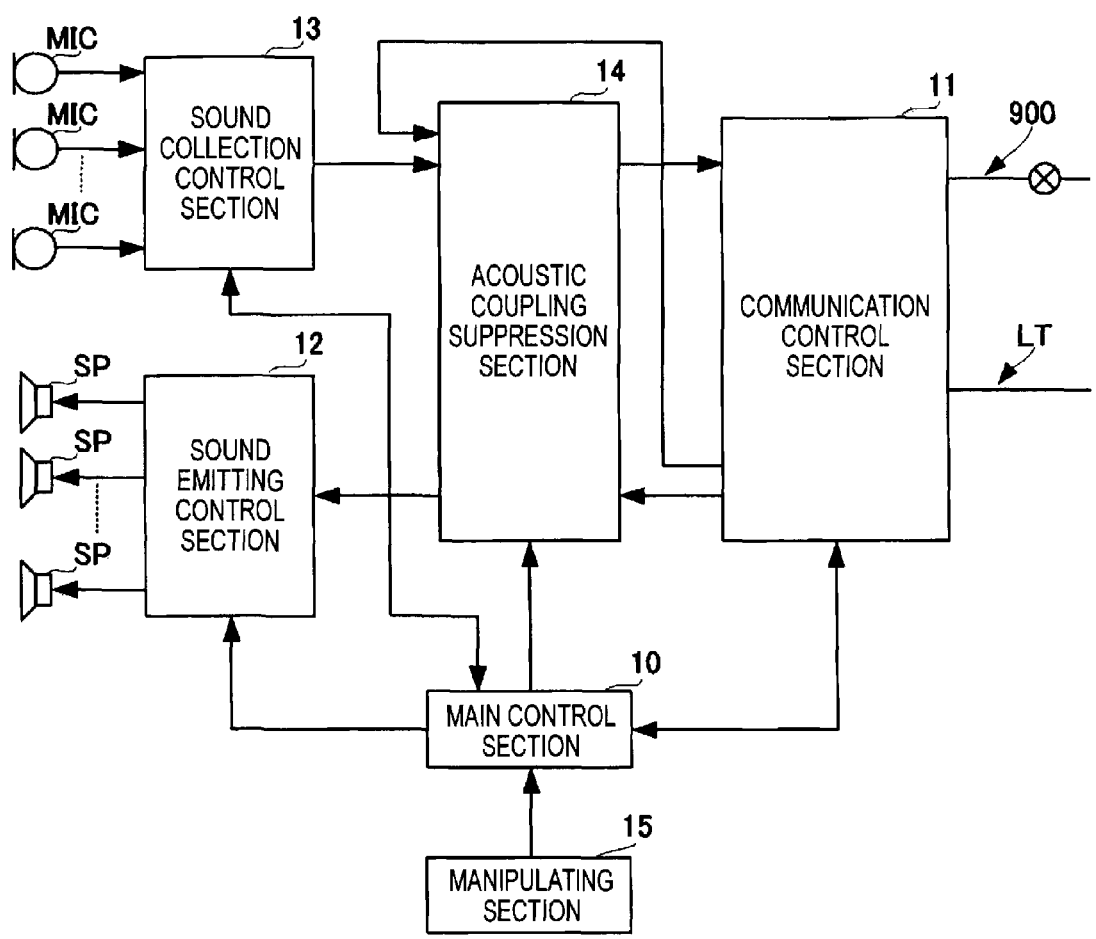
FIG. 2 is a block diagram illustrating the main components of a sound emitting and collecting apparatus.

FIG. 2 is a block diagram illustrating the main components of the sound emitting and collecting apparatus.

The sound emitting and collecting apparatuses 100 to 105 include a main control section 10, a communication control section 11, a sound emitting control section 12, a sound collection control section 13, an acoustic coupling suppression section 14, a manipulating section 15, a microphone array of a plurality of microphones MIC, and a speaker array of a plurality of speakers SP.

The main control section 10 controls the entire sound emitting and collecting apparatus and provides control based on the contents of a control input received at the manipulating section 15. The main control section 10 has a master control function and a slave control function. Thus, either the master control function or the slave control function is selected based on the manipulating input at the manipulating section 15 or the connecting detection result provided by the a connecting detection section 112 (shown in FIG. 3) of the communication control section 11. The main control section 10 provides control to operate as the master sound emitting and collecting apparatus when the master control function is selected, whereas it operates as the slave sound emitting and collecting apparatus when the slave control function is selected.

The communication control section 11 provides control to communications with other sound emitting and collecting apparatuses connected to the LT. The communication control section 11 operates differently depending on the master mode of operation or the slave mode of operation. In addition, the communication control section 11 also functions to connect to a network 900. This function is utilized only to construct a communication system, to which description will be given in more detail below in the communication system section in terms of its configuration and processing.

Figure 3:
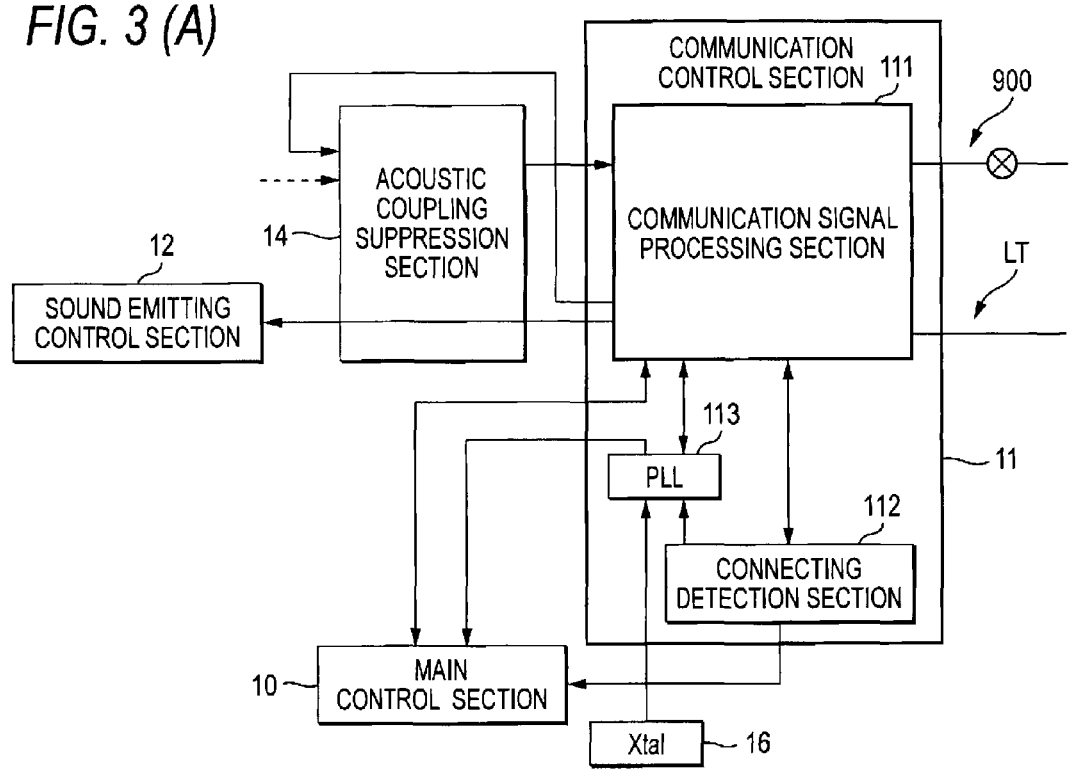
FIG. 3 is an explanatory block diagram illustrating the main components of a communication control section 11 and the operation of the communication control section 11.
Figure 3:
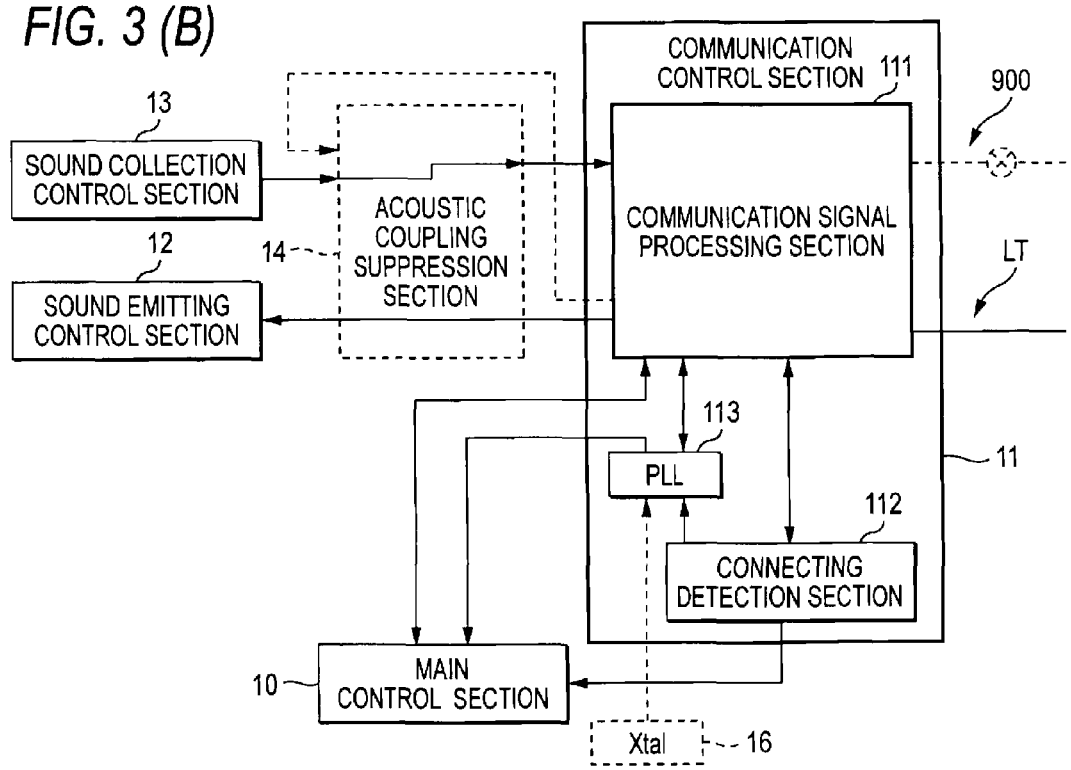

FIG. 3 is an explanatory block diagram illustrating the main components and the operation of the communication control section 11. FIG. 3(A) is an explanatory view illustrating the operation of the communication control section 11 of the master sound emitting and collecting apparatus, while FIG. 3(B) is an explanatory view illustrating the operation of the communication control section 11 of the slave sound emitting and collecting apparatus.

The communication control section 11 includes a communication signal processing section 111, a connecting detection section 112, and a PLL 113.

(i) Operation Common to Both the Master Sound Emitting and Collecting Apparatus and the Slave Sound Emitting and Collecting Apparatus The communication signal processing section 111 includes two transmission line connection terminals, to each of which the transmission line LT is connected to connect to two sound emitting and collecting apparatuses. On the other hand, since the sound emitting and collecting apparatus located at an end of the array of the sound emitting and collecting apparatuses connects to one sound emitting and collecting apparatus, the transmission line LT is connected to one of the two transmission line connection terminals.

The communication signal processing section 111 acquires a sound signal, a control signal, and a reference clock signal from a communication signal input through the transmission line LT. The communication signal processing section 111 outputs the control signal to the main control section 10.

The connecting detection section 112 detects the connection status of the transmission line LT of the communication signal processing section 111, and then outputs it to the main control section 10. According to the result of connecting detected, the main control section 10 sets the source of the reference clock signal to be supplied to the PLL 113 and the destination of the reference clock signal output by the PLL 113.

The PLL 113 is a so-called phase synchronization circuit, which produces a reference clock signal for output in synchronization with the acquired signal.

(ii) Operation of the Master Sound Emitting and Collecting Apparatus (See FIG. 3(A))

When the main control section 10 identifies itself as being a master sound emitting and collecting apparatus based on the connection status detection result provided by the connecting detection section 112, the source of the reference clock signal to be supplied to the PLL 113 is set to a quartz oscillator Xtal 16 included within the sound emitting and collecting apparatus. The PLL 113 produces and outputs the reference clock signal in synchronization with the reference clock signal from the quartz oscillator Xtal 116.

The communication signal processing section 111 outputs the sound signal transmitted from each of the slave sound emitting and collecting apparatuses through the transmission line LT to the sound collection control section 13 side input terminal of the acoustic coupling suppression section 14. The communication control section 11 forms a communication signal from the sound signal having been subjected to the acoustic coupling suppressing at the acoustic coupling suppression section 14, from the reference clock signal generated at the communication control section 11, and from the control signal, and then outputs the resulting signal to the transmission line LT or the network 900. Furthermore, in the case where the master sound emitting and collecting apparatus emits sound, the communication signal processing section 111 outputs the sound signal from the acoustic coupling suppression section 14 to the sound emitting control section 12 side input terminal of the acoustic coupling suppression section 14. In addition, in the aforementioned description, the source of the reference clock signal for the PLL 113 is defined as the quartz oscillator Xtal 16, however, it is also acceptable to use an externally input reference clock signal.

(iii) Operation of the Slave Sound Emitting and Collecting Apparatus (See FIG. 3(B))

The main control section 10 may identify itself as being a slave sound emitting and collecting apparatus based on the connection status detection result provided by the connecting detection section 112. In this case, the source of the reference clock signal to be supplied to the PLL 113 is set to the communication control section 11.

The communication signal processing section 111 outputs the reference clock signal to the PLL 113 based on the settings from the main control section 10. The PLL 113 produces and outputs the reference clock signal for its own apparatus in synchronization with the reference clock signal of an adjacent sound emitting and collecting apparatus, which has been input via the transmission line LT and via the communication signal processing section 111.

Furthermore, the communication signal processing section 111 outputs the sound signal acquired from the communication signal to the sound emitting control section 12 via the acoustic coupling suppression section 14.

Furthermore, the communication signal processing section 111 produces a communication signal from the sound signal input by the sound collection control section 13 via the acoustic coupling suppression section 14 and from the reference clock signal and the control signal that is produced by the slave sound emitting and collecting apparatus. At this time, since the functions of the acoustic coupling suppression section 14 are at standstill, the sound signal input to the communication signal processing section 111 is just the sound signal as output from the sound collection control section 13. In addition, detailed description will be given later of how the sound signal is processed in either the master mode of operation or the slave mode of operation.

The sound emitting control section 12 produces a speaker drive signal to be supplied to each speaker Sp in response to the sound emission directivity control from the main control section 10. More specifically, the sound emitting control section 12 allocates the sound signal from the communication control section 11 to each speaker SP, and performs delay and amplitude processing for each of the allocated sound signals to realize the specified sound emission directivity. The sound emitting control section 12 converts the sound signal, on which the delay processing or the like has been performed, from digital to analog and then amplifies the resulting signal with a given gain, thereby imparting it to each speaker SP as the speaker drive signal.

Each speaker SP of the speaker array is activated by the speaker drive signal supplied, thereby delivering the sound. Each of the microphones MIC of the microphone array collects the voice of a talker to produce a sound input signal, which is then output to the sound collection control section 13.

The sound collection control section 13 amplifies the sound input signal of each microphone MIC at a given gain, and then converts the resulting signal from analog to digital. On each of the sound input signals digitized in this manner, the sound collection control section 13 uses a predefined delay pattern and amplitude pattern to perform delay control and amplitude processing. Then, each of the sound input signals are added together, thereby producing a sound input beam signal that has a predetermined direction as the central direction of sound collection. At this time, the sound collection control section 13 prepares a plurality of mutually different delay patterns and amplitude patterns for computational processing, thereby producing a plurality of sound input beam signals. The sound collection control section 13 compares the levels of the plurality of sound input beam signals produced with one another, so that the sound input beam signal of the maximum level is selected and then output to the acoustic coupling suppression section 14.

The acoustic coupling suppression section 14 includes an adaptive filter, by which it produces a false acoustic signal. The acoustic coupling suppression section 14 subtracts the false acoustic signal from the sound input beam signal input by the sound collection control section 13 or the communication control section 11, thereby performing the acoustic coupling suppressing. The resulting signal is then output as the sound emitting signal to the communication control section 11. The acoustic coupling suppression section 14 is activated only in the master mode of operation and deactivated in the slave mode of operation.

Figure 4:
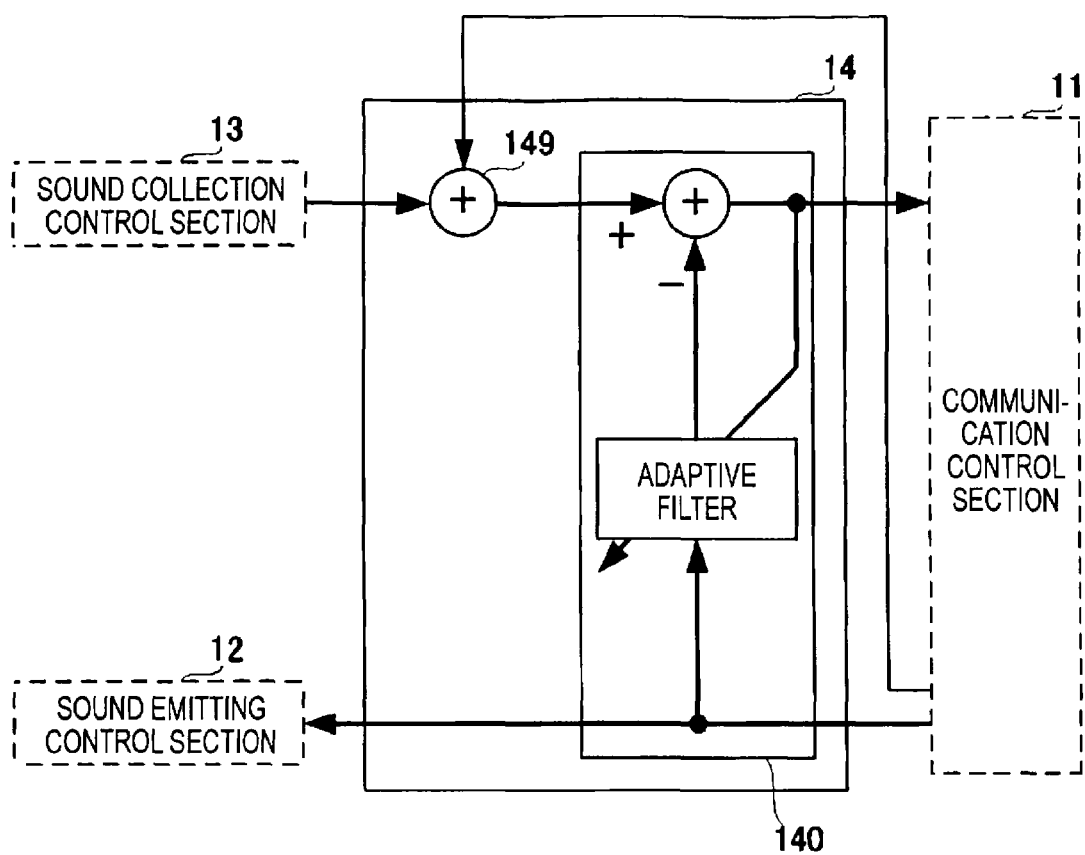
FIG. 4 is a block diagram illustrating the main components of an acoustic coupling suppression section 14.
Figure 5:
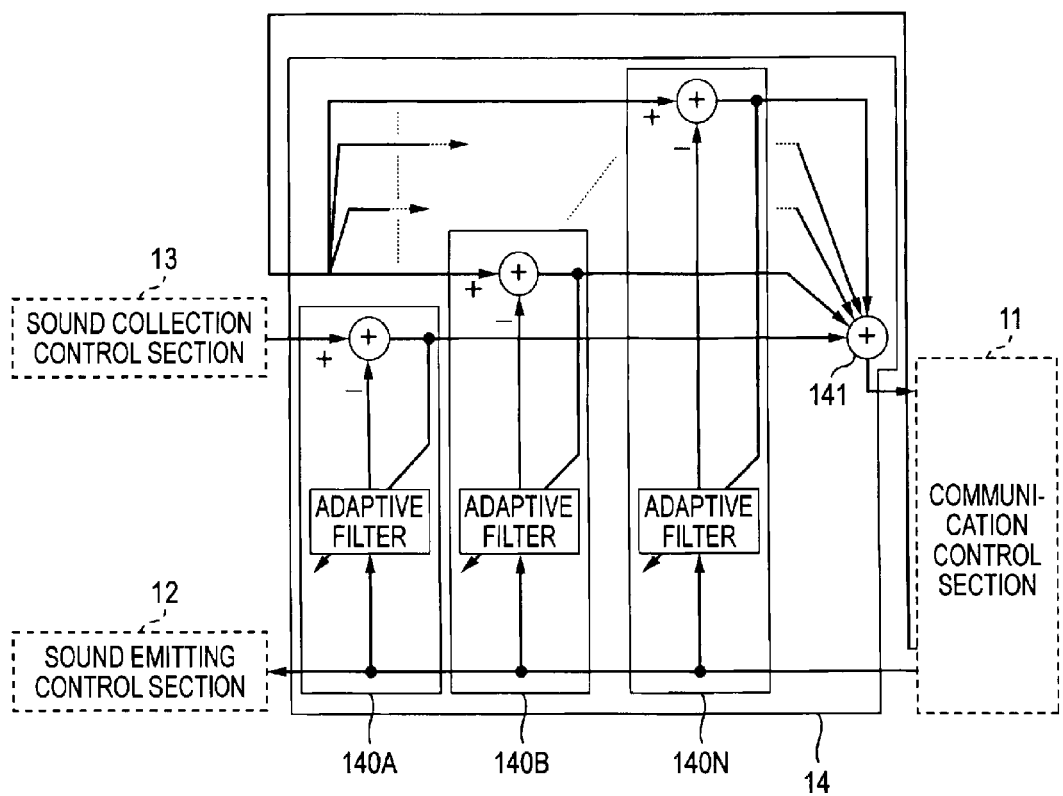
FIG. 5 is a block diagram illustrating the main components of the acoustic coupling suppression section 14.

FIGS. 4 and 5 illustrate a block diagram of the main components of the acoustic coupling suppression section 14. FIGS. 4 and 5 show those modes of the acoustic coupling suppression section 14 each corresponding to a particular resource. More specifically, FIG. 4 shows a mode in which a combined input sound signal is subjected collectively to the acoustic coupling suppressing, while FIG. 5 shows another mode in which each input sound signal is individually subjected to the acoustic coupling suppressing and thereafter combined.

(1) Mode in Which the Combined Input Sound Signal is Subjected Collectively to the Acoustic Coupling Suppressing (see FIG. 4)

In this mode, the acoustic coupling suppression section 14 includes a pre-combining section 149 and an acoustic coupling canceller 140.

The pre-combining section 149 combines each synchronized sound input beam signal into a combined sound input signal, which is then output to an adder of the acoustic coupling canceller 140. The acoustic coupling canceller 140 includes an adaptive filter and the adder. The adaptive filter produces a false acoustic signal in a known method based on the sound emitting signal returned via the communication control section and then outputs the resulting signal to the adder. The adder differentiates the false acoustic signal from the combined sound input signal, thereby producing the sound emitting signal to the communication control section 11. This configuration includes only one acoustic coupling canceller, i.e., a reduced amount of resources. Accordingly, the master sound emitting and collecting apparatus and the slave sound emitting and collecting apparatus can be specified and organized in the same manner.

(2) Mode in Which each Input Sound Signal is Individually Subjected to the Acoustic Coupling Suppressing and Thereafter Combined (see FIG. 5)

In this mode, the acoustic coupling suppression section 14 includes a plurality of acoustic coupling cancellers 140A to 140N and a post-processing combining section 141.

The acoustic coupling cancellers 140A to 140N provided are equal in number to the sound input beam signals input to the acoustic coupling suppression section 14. Each of the acoustic coupling cancellers 140A to 140N includes an adaptive filter and an adder, in which the sound input beam signal input to each canceller is subjected to the aforementioned acoustic coupling canceling to produce an individual sound emitting signal. The post-processing combining section 141 combines the individual sound emitting signals from each of the acoustic coupling cancellers 140A to 140N together, thereby producing the sound emitting signal. In this configuration, the acoustic coupling canceling is performed individually for each of the sound input beam signals, thus providing improved effects of the acoustic coupling suppressing. This may lead to an increase in resources. However, this configuration may be applied only to the master sound emitting and collecting apparatus. The slave sound emitting and collecting apparatus, on the other hand, which performs no acoustic coupling suppressing within the system, may be configured as described in (1) above, thus making it possible to realize the system at reduced cost.

Now, description will be given in more detail of the operation of the master sound emitting and collecting apparatus and the slave sound emitting and collecting apparatus of the sound enhancement system.

Figure 6:
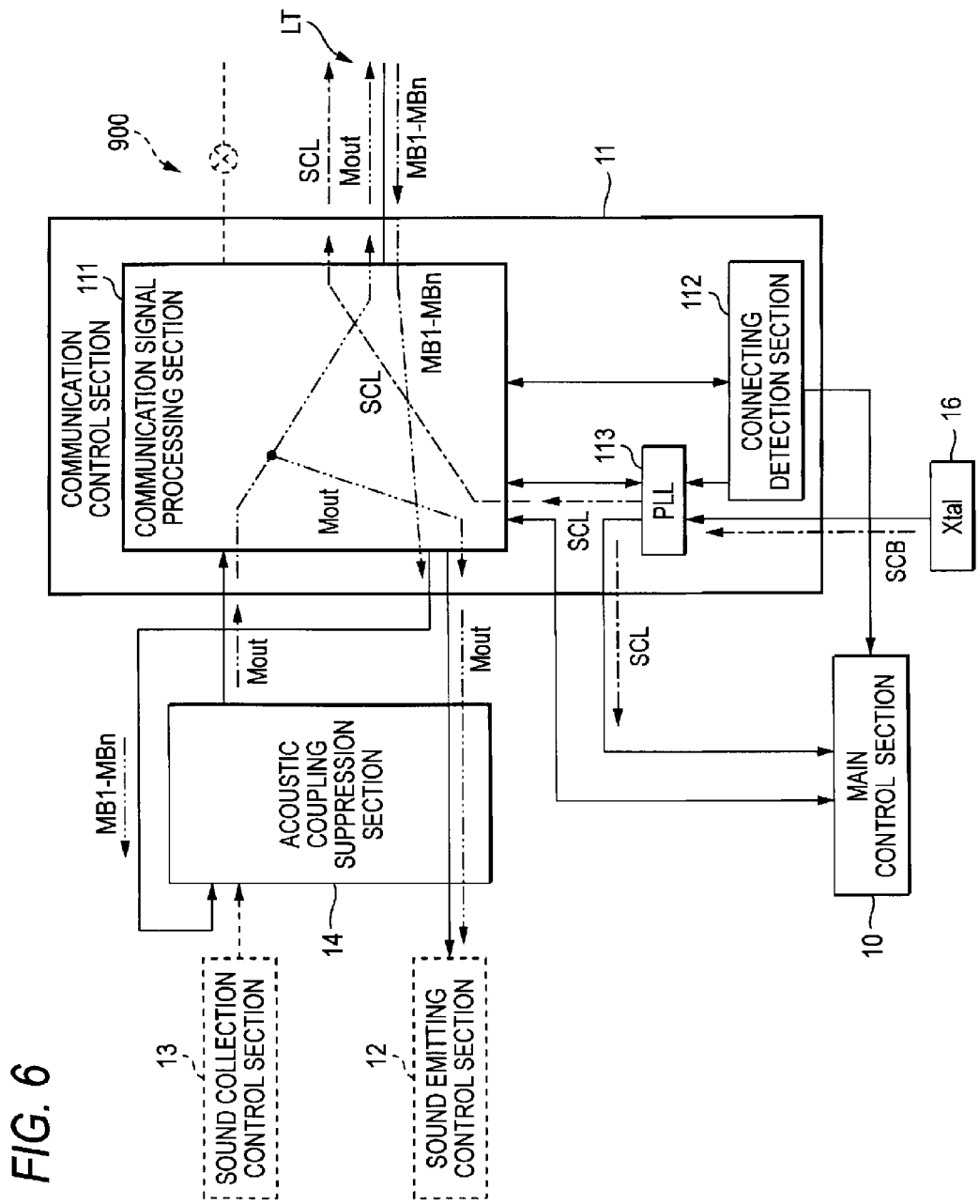
FIG. 6 is an explanatory view illustrating the operation of a master sound emitting and collecting apparatus of the sound enhancement system which performs no sound collection/emission processing.

FIG. 6 is an explanatory view illustrating the operation of the master sound emitting and collecting apparatus of the sound enhancement system in which it performs no sound collection/emission processing.

Figure 7:
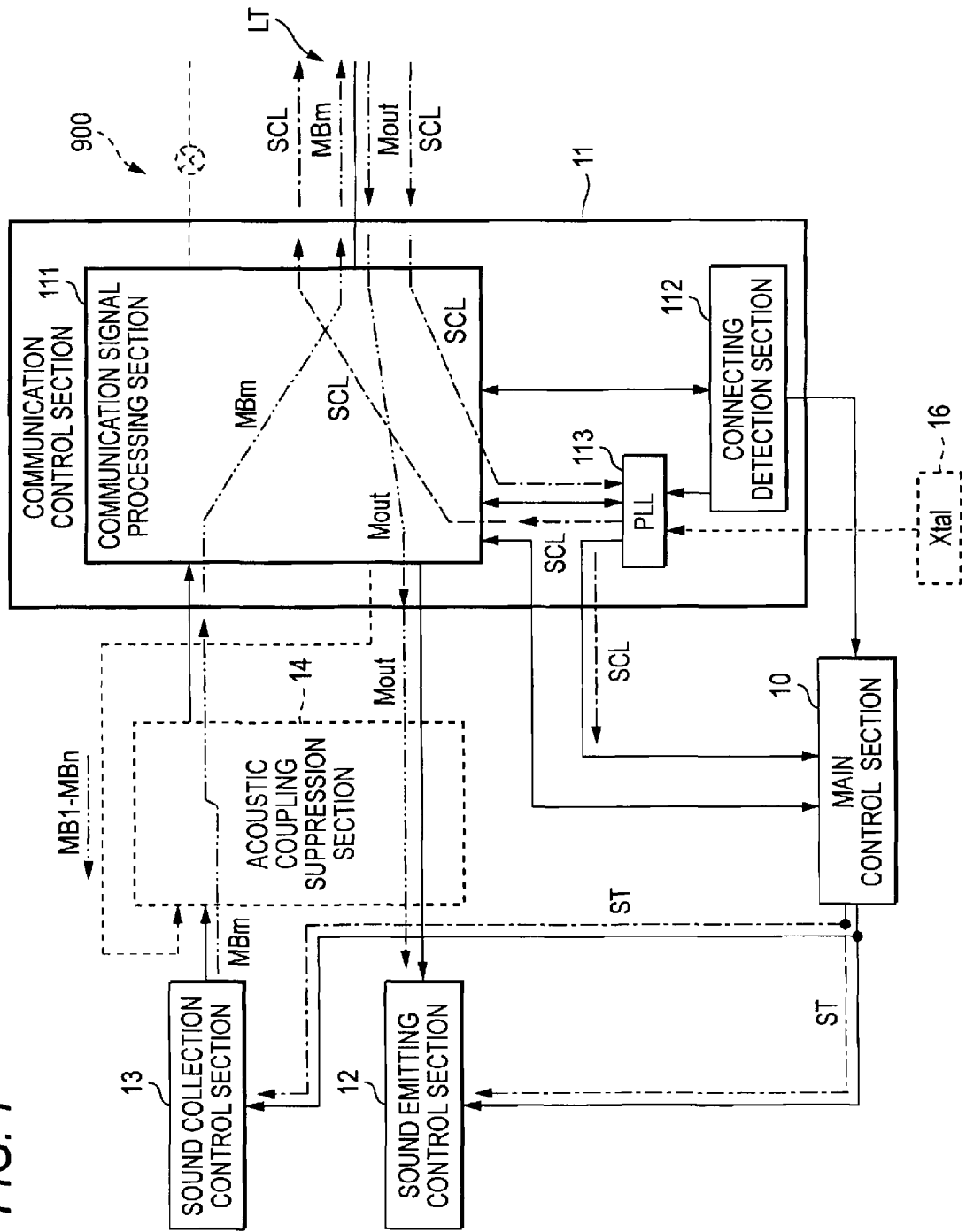
FIG. 7 is an explanatory view illustrating the operation of a slave sound emitting and collecting apparatus of the sound enhancement system.

FIG. 7 is an explanatory view illustrating the operation of the slave sound emitting and collecting apparatus of the sound enhancement system.

Figure 8:
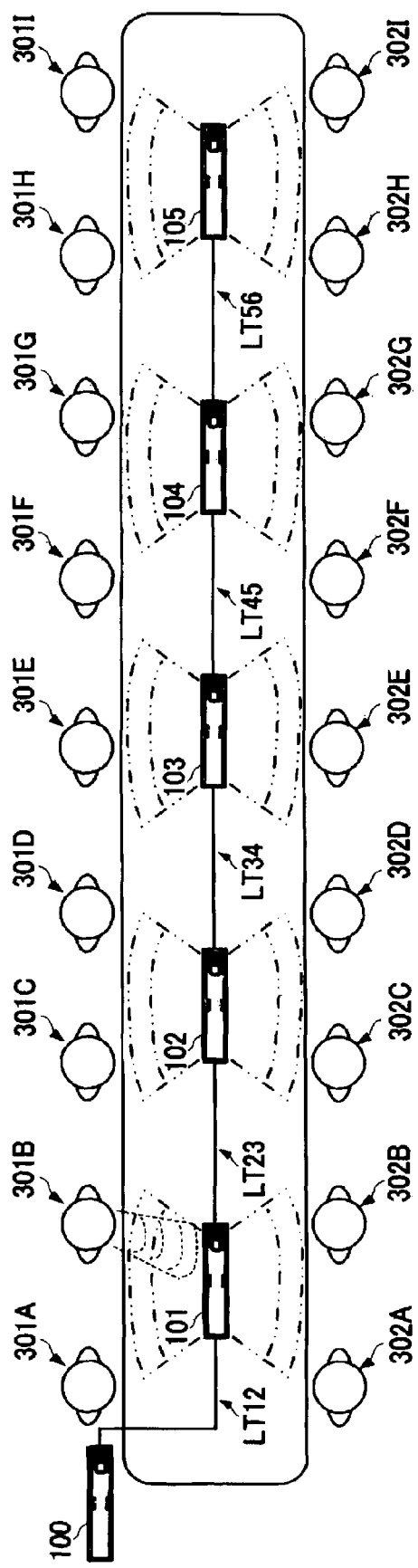
FIG. 8 is a view illustrating how the sound enhancement system performs voice enhancement, where the broken lines in the figure indicate the voice of a talker and the chain double-dashed lines show the emitted sound.

FIG. 8 is a view illustrating how the sound enhancement system performs voice enhancement, where the broken lines in the figure indicate the voice of a talker and the chain double-dashed lines show the emitted sound.

When the voice enhancement mode of the master sound emitting and collecting apparatus 100 is demanded by a manipulating input, the master sound emitting and collecting apparatus 100 outputs a connection check command signal to the transmission line LT, and then receives a response from the slave sound emitting and collecting apparatuses 101 to 105 for detection at the connecting detection section 112. As such, the master sound emitting and collecting apparatus 100 detects active ones of the slave sound emitting and collecting apparatuses 101 to 105. At this time, each of the slave sound emitting and collecting apparatuses 101 to 105 also detects its own connecting status using their respective connecting detection section 112.

With reference to FIG. 6, the communication control section 11 of the master sound emitting and collecting apparatus 100 allows the PLL 113 to produce a reference clock signal SCL based on an oscillator signal SCB output from a quartz oscillator 16. The communication control section 11 outputs the reference clock signal SCL to the slave sound emitting and collecting apparatus 101 via the transmission line LT01. At this time, the communication control section 11 supplies the reference clock signal SCL to the main control section 10.

With reference to FIG. 7, the communication signal processing section 111 of the slave sound emitting and collecting apparatus 101 detects the reference clock signal SCL coming from the master sound emitting and collecting apparatus 100 side and detected at the connecting detection section 112, and then supplies the resulting signal to the PLL 113. The PLL 113 produces a new reference clock signal SCL in synchronization with the reference clock signal SCL of the master sound emitting and collecting apparatus 100, and supplies it to the main control section 10. The PLL 113 also outputs it to the slave sound emitting and collecting apparatus 102 that has been detected by the connecting detection section 112. Such a reference clock signal SCL is transmitted to each of the slave sound emitting and collecting apparatuses 101 to 105, thereby allowing each of the slave sound emitting and collecting apparatuses 101 to 105 to input and output the sound signal in synchronization with the master sound emitting and collecting apparatus 100.

When the microphone array collects the voice of the conferees 301B, the slave sound emitting and collecting apparatuses 101 to 105 allow the sound collection control section 13 to produce a sound input beam signal MBm. The slave sound emitting and collecting apparatuses 101 to 105 have deactivated the function of the acoustic coupling suppression section 14, and the sound collection control section 13 performs no acoustic coupling suppressing the sound input beam signal, which is thus output to the communication control section 11. The communication signal processing section 111 of the communication control section 11 converts the sound input beam signal MBm to the sound communication data format for the transmission line LT. The communication signal processing section 111 outputs the sound input beam signal MBm turned as sound communication data to the master sound emitting and collecting apparatus 100 via the transmission line LT in synchronization with the aforementioned reference clock signal SCL. In addition, either the output timing of the sound communication data or the production timing of the sound input beam signal MBm may be synchronized with the reference clock signal SCL as long as one of them is commonly adopted in all of the slave sound emitting and collecting apparatuses 101 to 105. As such, each of the slave sound emitting and collecting apparatuses 101 to 105 collects voices in synchronization with one another, thereby eliminating temporal jitter in sound collection occurring between the slave sound emitting and collecting apparatuses 101 to 105 with respect to the master sound emitting and collecting apparatus 100.

Referring back to FIG. 6, the communication signal processing section 111 of the master sound emitting and collecting apparatus 100 acquires each sound input beam signal MBm from each of the slave sound emitting and collecting apparatuses 101 to 105. That is, the sound communication data containing the sound input beam signals MB1 to MBn transmitted from all the slave sound emitting and collecting apparatuses is acquired. Then, the sound input beam signals MB1 to MBn are output to the acoustic coupling suppression section 14. The acoustic coupling suppression section 14, as initially having no sound to emit, produces a sound emitting signal Mout made up of these sound input beam signals MB1 to MBn for output to the communication signal processing section 111. On the other hand, when emission of sound is started, the communication signal processing section 111 separates and sends the sound emitting signal Mout back to the acoustic coupling suppression section 14. The acoustic coupling suppression section 14 produces a false acoustic signal based on the sound emitting signal Mout, and then executes the acoustic coupling suppressing the sound input beam signals MB1 to MBn. At this time, the acoustic coupling suppression section 14 may take the configuration of either FIG. 4 or FIG. 5 above.

In this manner, the acoustic coupling suppression section 14 of the master sound emitting and collecting apparatus 100 performs the acoustic coupling suppressing to provide the sound emitting signal Mout (only initially, no acoustic coupling suppressing is performed), which is converted by the communication signal processing section 111 to sound communication data in the transmission line format. The communication signal processing section 111 outputs the sound communication data containing the sound emitting signal Mout to the slave sound emitting and collecting apparatus 101 via the transmission line LT in synchronization with the reference clock signal SCL. The data is then transmitted from the slave sound emitting and collecting apparatus 101 to the slave sound emitting and collecting apparatus 105 in sequence.

Referring back to FIG. 7, the communication signal processing section 111 of the slave sound emitting and collecting apparatuses 101 to 105 acquires the sound communication data containing the sound emitting signal Mout, and then outputs the sound emitting signal Mout to the sound emitting control section 12. The sound emitting control section 12 emits sound based on the sound emitting signal Mout in accordance with the predefined sound emission directivity. At this time, each of the slave sound emitting and collecting apparatuses 101 to 105 emits sound in synchronization with the reference clock signal SCL. The emitted sound is conveyed to the conferees 301A to 301I and 302A to 302I so that each conferee can listen to it. As such, regardless of the position of a talker, the voice of that talker can reliably be addressed to all the conferees.

Referring to FIG. 8, a more specific example will now be explained. A voice of the conferee 301B will be collected by the slave sound emitting and collecting apparatus 101 in the sound coverage area of which the conferee 301B is located. The slave sound emitting and collecting apparatus 101 produces and outputs the sound input beam signal, without performing the acoustic coupling suppressing, in synchronization with the reference clock signal produced by the master sound emitting and collecting apparatus 100. The master sound emitting and collecting apparatus 100 acquires the sound input beam signal from the slave sound emitting and collecting apparatus 101 and performs the acoustic coupling suppressing, thereby producing the sound emitting signal Mout for output to each of the slave sound emitting and collecting apparatuses 101 to 105. Each of the slave sound emitting and collecting apparatuses 101 to 105 emits sound to their respective sound emission areas based on the sound emitting signal Mout received sequentially via the transmission line LT. This allows all the conferees 301A to 301I and 302A to 302I to catch the voice of the talker 301B. At this time, the acoustic coupling suppressing (howling canceling in this case) performed by the master sound emitting and collecting apparatus can suppress howling and thus provide sound at a high S/N ratio. Moreover, since the acoustic coupling suppressing is performed only by the master sound emitting and collecting apparatus, only the number of slave sound emitting and collecting apparatuses actually installed can be changed depending on the dimensions of the conference room in order to realize the optimal sound enhancement system. Furthermore, since the slave sound emitting and collecting apparatus is intended only to collect and emit sound, the acoustic coupling suppression section is just required to sufficiently serve to perform the acoustic coupling suppressing when used singly, and can be thus realized at low cost. Accordingly, the system can be made up of an expensive, high-functional master sound emitting and collecting apparatus and a comparatively inexpensive, less-functional slave sound emitting and collecting apparatus, thereby making it possible to realize the system at lower cost when compared to a system made up only of the expensive, high-functional sound emitting and collecting apparatus.

Here, since the sound enhancement system consists only of a long-length sound emitting and collecting apparatus and a transmission line, this sound enhancement system can be realized in a simple manner even in a conference of a number of attendants such as the one mentioned above. Furthermore, since only changing the number of sound emitting and collecting apparatuses connected allows the sound collection/ emission areas to vary, it is thus possible to construct a flexible sound enhancement system in a simple manner based on the dimensions of the conference room and the number of conferees.

Furthermore, in such a sound enhancement system, each of the slave sound emitting and collecting apparatuses 101 to 105 can collect and emit sound synchronously. This allows the sound input beam signals MB1 to MBn to be free from temporal jitter as well as the sound emitting signal Mout component, which may be contained in the sound input beam signals MB1 to MBn, to be free from temporal jitter. Accordingly, the acoustic coupling suppression section 14 of the master sound emitting and collecting apparatus 100 can provide stable acoustic coupling suppressing, thus providing the acoustic coupling suppressing more effectively. That is, it is possible to ensure that the problem with the acoustic coupling (howling in this case) is more reliably suppressed, allowing all conferees to provide the voice of a talker at a higher S/N ratio.

In addition, in the aforementioned description, such an example has been provided in which the master sound emitting and collecting apparatus does not collect or emit sound, however, the master sound emitting and collecting apparatus may also collect and emit sound. In this case, the master sound emitting and collecting apparatus is also located on the table just as the other slave sound emitting and collecting apparatuses.

Figure 9:
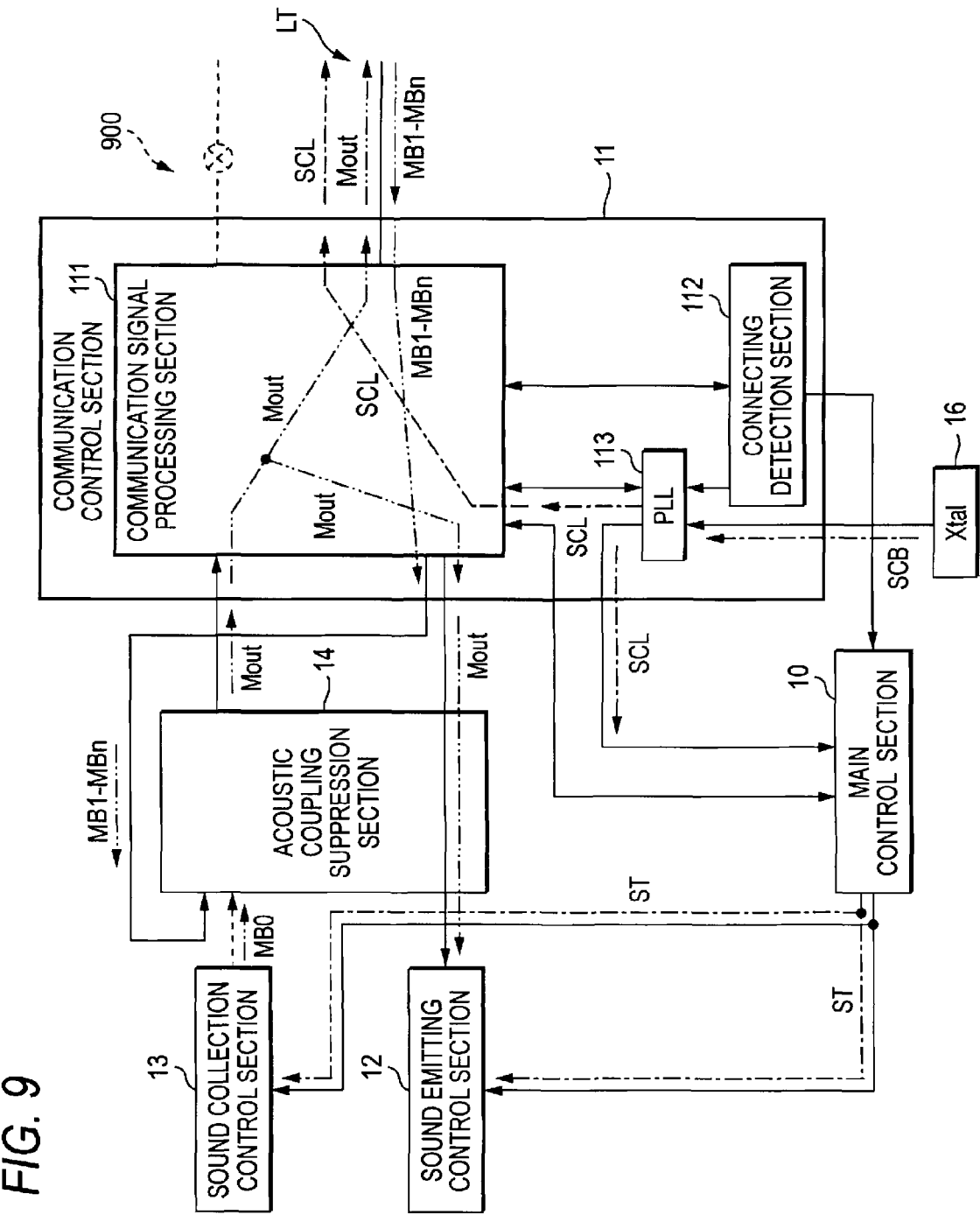
FIG. 9 is an explanatory view illustrating the operation of a master sound emitting and collecting apparatus of the sound enhancement system which performs sound collection/emission processing.

FIG. 9 is an explanatory view illustrating the operation of a master sound emitting and collecting apparatus of the sound enhancement system which performs sound collection/emission processing.

The master sound emitting and collecting apparatus 100, while performing the sound collection/emission processing, also performs the same processing on the other slave sound emitting and collecting apparatuses. Accordingly, description will be given here of the operation that is executed only to collect and emit sound.

The acoustic coupling suppression section 14 of the master sound emitting and collecting apparatus 100 receives a sound input beam signal MB0 produced by the sound collection control section 13 of the master sound emitting and collecting apparatus 100 as well as the sound input beam signals MB1 to MBn from the other slave sound emitting and collecting apparatuses 101 to 105. The acoustic coupling suppression section 14 performs the acoustic coupling suppressing these sound input beam signals MB0 to MBn. More specifically, the acoustic coupling suppression section 14 produces a false acoustic signal based on the sound emitting signal Mout having been already output from the acoustic coupling suppression section 14 to the communication control section 11, and executes the acoustic coupling suppressing the sound input beam signals MB0 to MBn. At this time, the acoustic coupling suppression section 14 may take the configuration of either FIG. 4 or FIG. 5. In this manner, the sound emitting signal Mout used for the acoustic coupling suppressing is supplied to the sound emitting control section 12, so that the sound emitting control section 12 emits sound based on the sound emitting signal Mout. For the master sound emitting and collecting apparatus 100 to collect and emit sound, the master sound emitting and collecting apparatus 100 performs collection and emission of sound in synchronization with the reference clock signal SCL. In this manner, the master sound emitting and collecting apparatus 100 can also operate as the same sound collection/emission section as the slave sound emitting and collecting apparatuses 101 to 105. This allows the number of sound emitting and collecting apparatuses for the same sound collection/emission area to be reduced by one, when compared with the mode in which the master sound emitting and collecting apparatus used does not collect and emit sound. As such, it is possible to realize the sound enhancement system in a simplified configuration.

(Communication System)

Figure 10:
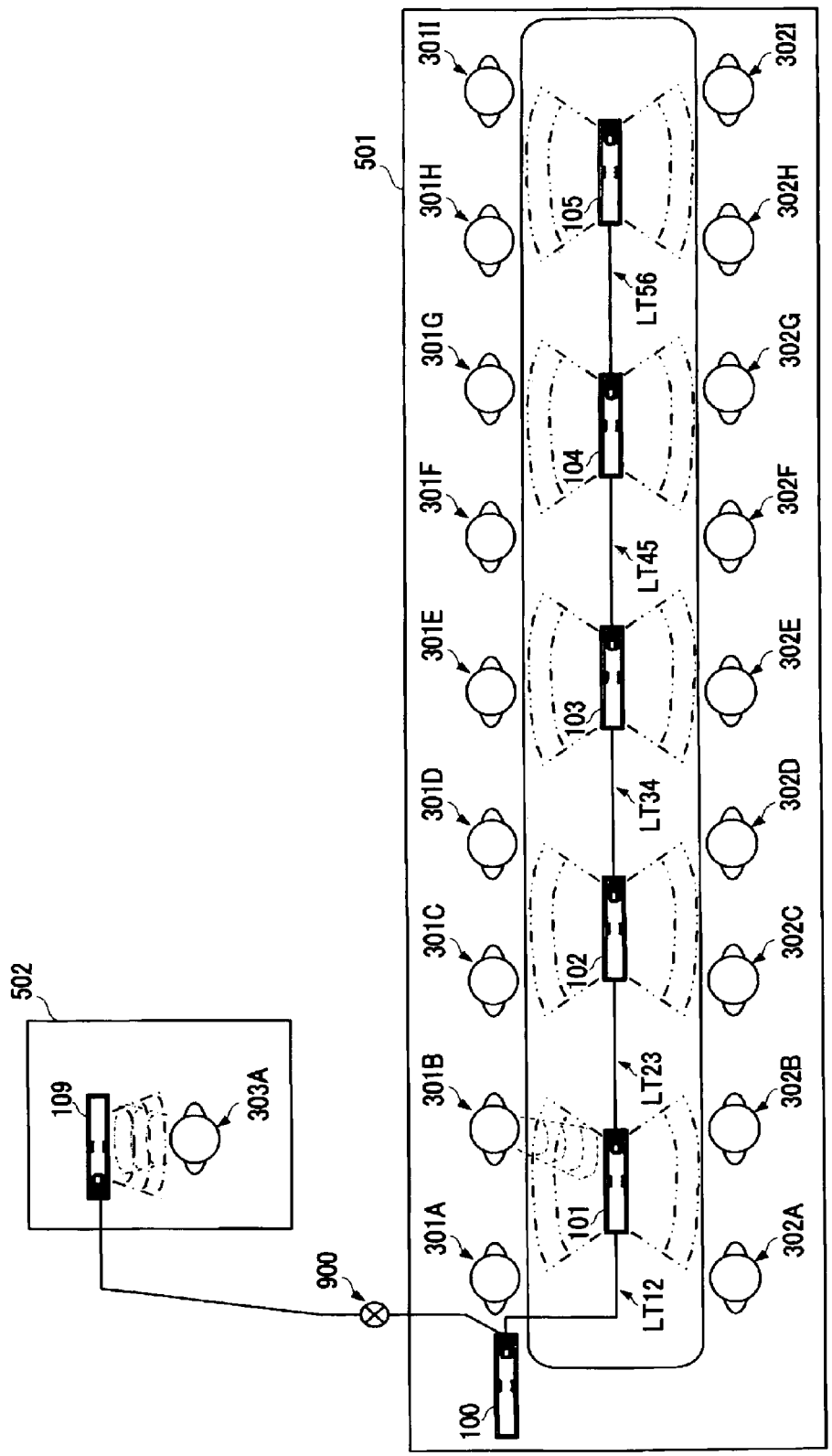
FIG. 10 is a view illustrating the system configuration of a communication system according to the present embodiment and the operation status of the communication system.

FIG. 10 is a view illustrating the system configuration of a communication system according to the present embodiment and the operation status of the communication system. In the figure, the alternate long and short dashed lines denote the sound which has been collected in a conference room 501 and emitted in a conference room 502, while the chain double-dashed lines denote the sound which has been collected in the conference room 502 and emitted in the conference room 501.

As shown in FIG. 10, the communication system includes the network 900 and a sound emitting and collecting apparatus 109 located in another conference room 502 in addition to the configuration of the voice enhancement system of FIG. 1 located in the conference room 501. In the other conference room 502, a conferee 303A is present near the sound emitting and collecting apparatus 109. The sound emitting and collecting apparatus 101 and the sound emitting and collecting apparatus 109 are connected to each other via the network 900 and controlled by the known general network communication protocol such as TCP/IP.

The sound emitting and collecting apparatuses 100 to 105 of the conference room 501 are related to each other just as in the aforementioned master/slave relationship. The control signal and the reference clock signal transmitted between the master sound emitting and collecting apparatus 100 and the slave sound emitting and collecting apparatuses 101 to 105 are the same as those of the aforementioned sound enhancement system. Accordingly, description will be given below only of the operation and processing inherent to the communication system.

Figure 11:
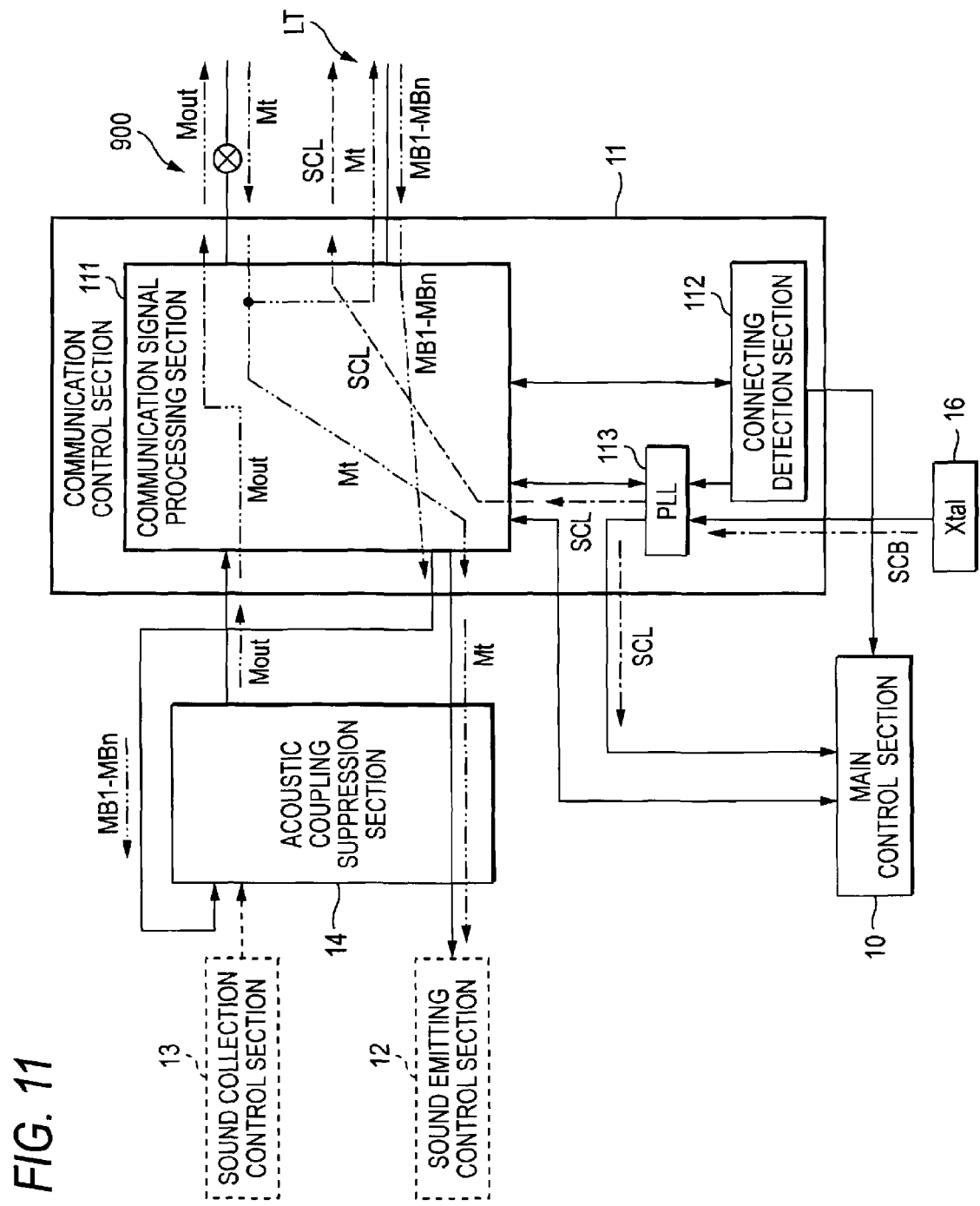
FIG. 11 is an explanatory view illustrating the operation of a master sound emitting and collecting apparatus in the communication system which performs no sound collection/emission processing.

FIG. 11 is an explanatory view illustrating the operation of a master sound emitting and collecting apparatus in the communication system which does not collect and emit sound.

Figure 12:
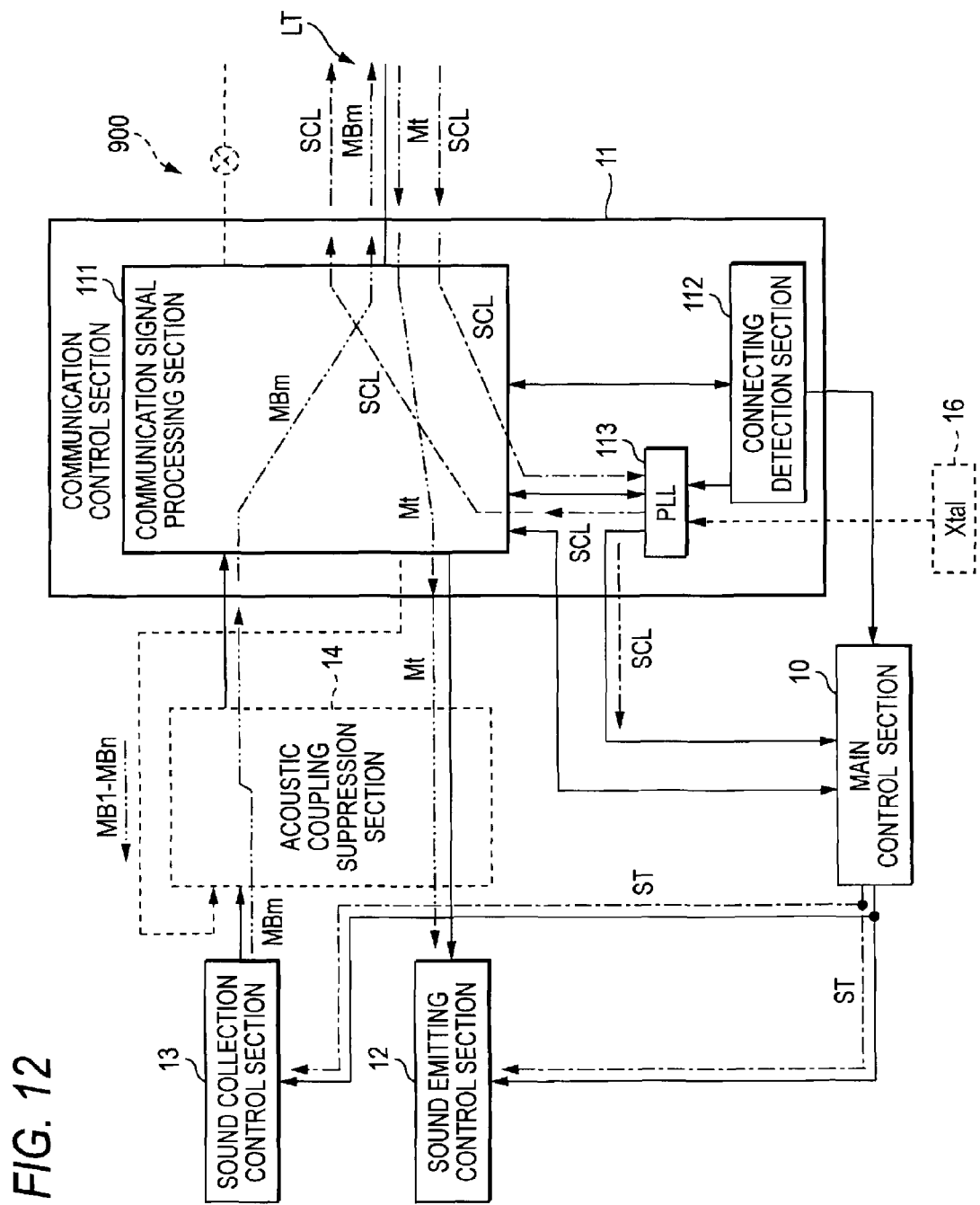
FIG. 12 is an explanatory view illustrating the operation of a slave sound emitting and collecting apparatus in the communication system.

FIG. 12 is an explanatory view illustrating the operation of a slave sound emitting and collecting apparatus in the communication system.

With reference to FIG. 11, the communication signal processing section 111 of the master sound emitting and collecting apparatus 100 receives sound communication data from a sender via the network 900 and acquires an external sound emitting signal Mt. The communication signal processing section 111 outputs the external sound emitting signal Mt to the acoustic coupling suppression section 14 as well as converts it to the sound communication data that conforms to the transmission line LT. The communication signal processing section 111 outputs the sound communication data containing the external sound emitting signal Mt to the slave sound emitting and collecting apparatuses 101 to 105 sequentially via the transmission line LT.

With reference to FIG. 12, the communication signal processing section 111 of the slave sound emitting and collecting apparatuses 101 to 105 acquires the sound communication data containing the external sound emitting signal Mt, and then outputs the external sound emitting signal Mt to the sound emitting control section 12. The sound emitting control section 12 emits sound based on the external sound emitting signal Mt in accordance with the predefined sound emission directivity. At this time, each of the slave sound emitting and collecting apparatuses 101 to 105 emits sound in synchronization with the reference clock signal SCL. The emitted sound is conveyed to the conferees 301A to 301I and 302A to 302I. This allows the voice of the talker 303A collected by the external sound emitting and collecting apparatus 109 connected via the network 900 to reach all the conferees 301A to 301I and 302A to 302I.

Furthermore, as with the aforementioned sound enhancement system, the slave sound emitting and collecting apparatuses 101 to 105 collect voices from those conferees located around them in synchronization with the reference clock signal SCL of the master sound emitting and collecting apparatus 100, and produce the sound input beam signal MBm. The slave sound emitting and collecting apparatuses 101 to 105 output the sound input beam signal MBm, without performing the acoustic coupling suppressing, to the master sound emitting and collecting apparatus 100 via the transmission line LT.

Referring back to FIG. 11, the communication signal processing section 111 of the master sound emitting and collecting apparatus 100 operates in the same manner as the sound enhancement system mentioned above. That is, the communication signal processing section 111 acquires the sound input beam signals MB1 to MBn (based on the sound input beam signal MBm of each slave sound emitting and collecting apparatus) from the sound communication data output by each of the slave sound emitting and collecting apparatuses 101 to 105. Then, the signals are input to the sound collection control section 13 side of the acoustic coupling suppression section 14. The acoustic coupling suppression section 14, which is configured as shown above in FIG. 4 and FIG. 5, produces a false acoustic signal based on the external sound emitting signal Mt and executes the acoustic coupling suppressing the sound input beam signals MB1 to MBn, thereby producing the sound emitting signal Mout. The acoustic coupling suppression section 14 outputs the sound emitting signal Mout to the communication signal processing section 111. Such processing allows the acoustic coupling of the external sound emitting signal Mt to the sound input beam signals MB1 to MBn in the slave sound emitting and collecting apparatuses 101 to 105 to be suppressed only by the acoustic coupling suppression section 14 of the master sound emitting and collecting apparatus 100.

The communication signal processing section 111 converts the sound emitting signal Mout to the sound communication data of the format suitable for the network 900, and then transmits the resulting data to the external sound emitting and collecting apparatus 109 connected via the network 900. The external sound emitting and collecting apparatus 109 acquires and emits the sound emitting signal Mout from the sound communication data.

As described above, the communication system of the present embodiment can be used in remote communication sound conferences with a number of conferees present in each conference room, thereby ensuring that the voice of a talker reaches all the other conferees. At this time, since the master sound emitting and collecting apparatus performs the acoustic coupling suppressing (in this case, echo canceling), it is possible to suppress acoustic echoes and provide sound at a higher S/N ratio. Moreover, the acoustic coupling suppressing is performed only by the master sound emitting and collecting apparatus. Thus, changes can be made depending on the dimensions of the conference room only for the number of slave sound emitting and collecting apparatuses installed, thereby realizing an optimal communication system. Furthermore, since the slave sound emitting and collecting apparatuses are intended only to collect and emit sound, the acoustic coupling suppression section is just required to sufficiently serve to perform the acoustic coupling suppressing when used singly, and can be thus realized at low cost. Accordingly, the system can be made up of an expensive, high-functional master sound emitting and collecting apparatus and a comparatively inexpensive, less-functional slave sound emitting and collecting apparatus, thereby making it possible to alter the system at lower cost when compared to a system made up only of the expensive, high-functional sound emitting and collecting apparatus.

In addition, the master sound emitting and collecting apparatus did not collect and emit sound in the aforementioned communication system, however, it may also perform collection and emission of sound. In this case, the master sound emitting and collecting apparatus is also located on the table just like the other slave sound emitting and collecting apparatuses.

Figure 13:
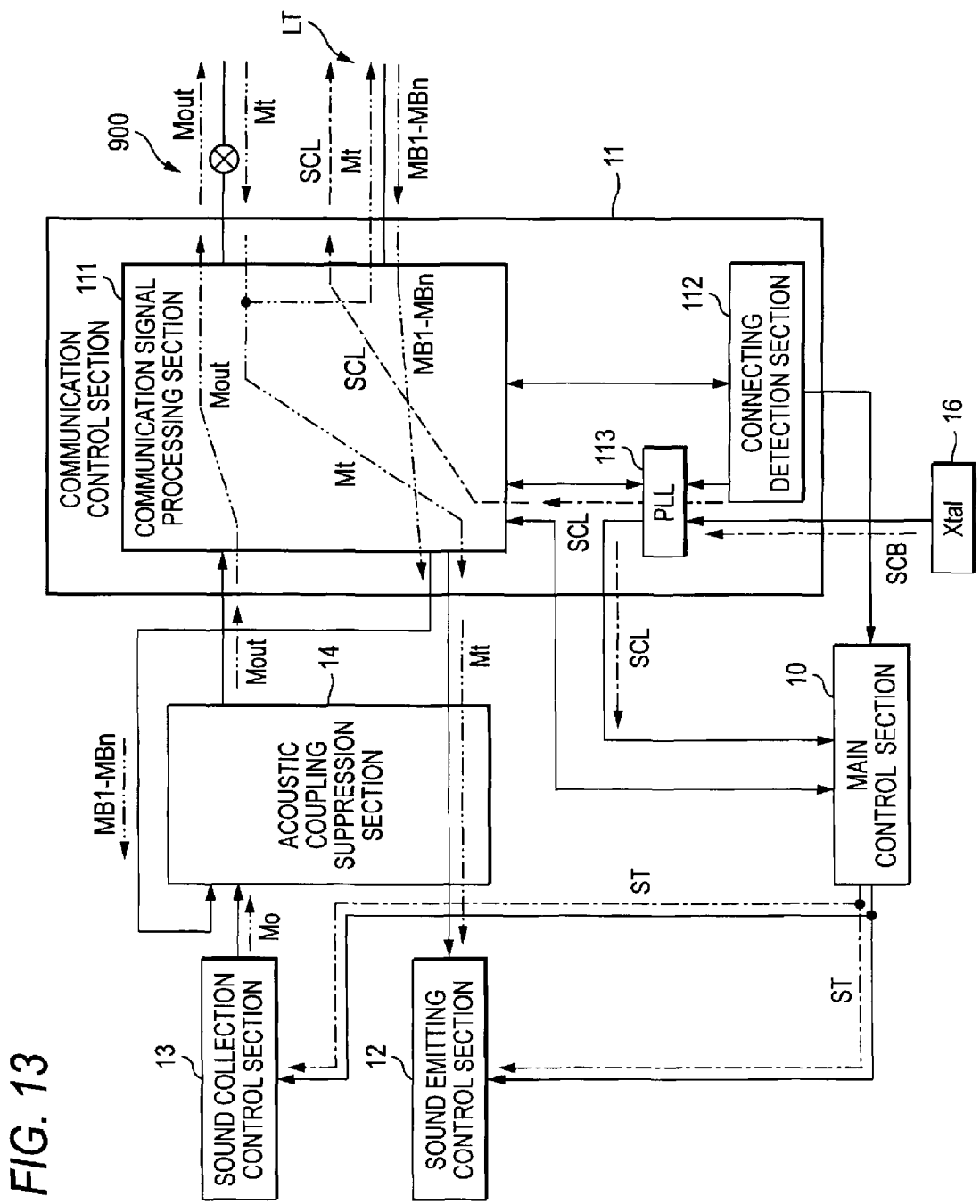
FIG. 13 is an explanatory view illustrating the operation of a master sound emitting and collecting apparatus of the communication system which performs sound collection/emission processing.

FIG. 13 is an explanatory view illustrating the operation of the master sound emitting and collecting apparatus in the communication system which performs input and output processing of sound.

The master sound emitting and collecting apparatus 100, which performs input and output processing of sound, also performs the same processing for the other slave sound emitting and collecting apparatuses and the external sound emitting and collecting apparatus (network). Accordingly, description will be given here of the operation that is performed only to collect and emit sound.

The acoustic coupling suppression section 14 of the master sound emitting and collecting apparatus 100 receives the sound input beam signal MB0 produced by the sound collection control section 13 of the master sound emitting and collecting apparatus 100 as well as the sound input beam signals MB1 to MBn from the other slave sound emitting and collecting apparatuses 101 to 105. The acoustic coupling suppression section 14 performs the acoustic coupling suppressing the sound input beam signals MB0 to MBn. More specifically, the acoustic coupling suppression section 14 produces a false acoustic signal based on the external sound emitting signal Mt input by the communication control section 11 and executes the acoustic coupling suppressing the sound input beam signals MB0 to MBn. At this time, the acoustic coupling suppression section 14 may take the configuration of either FIG. 4 or FIG. 5. In this manner, the external sound emitting signal Mt used for the acoustic coupling suppressing is supplied to the sound emitting control section 12, so that the sound emitting control section 12 emits sound based on the external sound emitting signal Mt. In the case where the master sound emitting and collecting apparatus 100 collects and emits sound, the master sound emitting and collecting apparatus 100 performs collection and emission of sound in synchronization with the reference clock signal SCL. In this manner, the master sound emitting and collecting apparatus 100 can also operate as the same sound collection/emission section as the slave sound emitting and collecting apparatuses 101 to 105. This allows the number of sound emitting and collecting apparatuses for the same sound collection/emission area to be reduced by one, when compared with the mode in which the master sound emitting and collecting apparatus used does not collect and emit sound. It is thus possible to construct the communication system in a simplified configuration.

(Voice Enhancement/Communication System)

In the aforementioned description, such an example has been illustrated in which the sound enhancement system and the communication system separately operate, however, it is also possible to realize such a voice enhancement/communication system which enables voice enhancement and communication to be carried out simultaneously.

In the voice enhancement/communication system, the slave sound emitting and collecting apparatuses 101 to 105 have the same sound collection function as that of the sound enhancement system and the communication system, while as the sound emission function, the sound emitting signal Mout and the external sound emitting signal Mt are emitted. At this time, the slave sound emitting and collecting apparatuses 101 to 105 may be provided with the sound emission directivity control after the sound emitting signal Mout and the external sound emitting signal Mt have been mixed. However, the sound emitting signal Mout and the external sound emitting signal Mt may be mixed for each speaker SP after the sound emission directivity control has been provided thereto. This allows the sound emitting signal Mout and the external sound emitting signal Mt to be emitted with different sound emission characteristics, so that each conferee can distinguishably catch the internally enhanced sound and the external sound.

Figure 14:
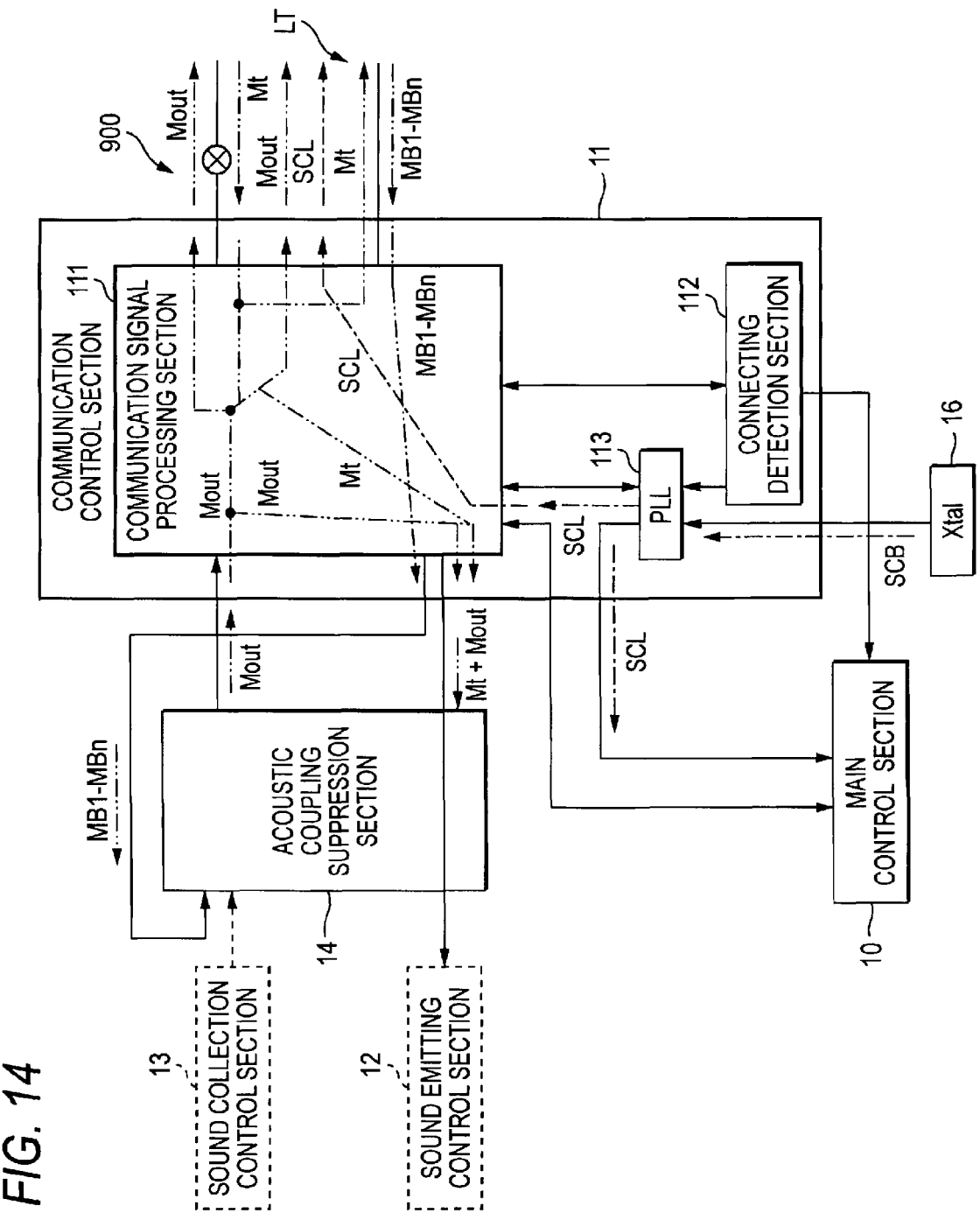
FIG. 14 is an explanatory view illustrating the operation of a master sound emitting and collecting apparatus of a voice enhancement/communication system.

FIG. 14 is an explanatory view illustrating the operation of the master sound emitting and collecting apparatus in the voice enhancement/communication system. In this case, the master sound emitting and collecting apparatus performs no sound collection/emission processing.

The master sound emitting and collecting apparatus 100 collectively performs, as the fundamental function, both the function of the aforementioned sound enhancement system and the function of the communication system. That is, the master sound emitting and collecting apparatus 100 executes the acoustic coupling suppressing the sound input beam signals MB1 to MBn acquired via the transmission line LT and thereby produces the sound emitting signal Mout for transmission and delivery via the network 900 and the transmission line LT. At this time, the acoustic coupling suppression section 14 executes the acoustic coupling suppressing based on the sound emitting signal Mout and the external sound emitting signal Mt. More specifically, the acoustic coupling suppression section 14, configured as shown in FIG. 4 or FIG. 5, produces a false acoustic signal based on the mixed sound signal of the sound emitting signal Mout and the external sound emitting signal Mt, and then performs the acoustic coupling suppressing the resulting signal. Alternatively, the acoustic coupling suppression section 14 may be made up of the two configurations as shown in FIG. 4 or FIG. 5. Thus, the false acoustic signal based on the sound emitting signal Mout and the false acoustic signal based on the external sound emitting signal Mt may be used to execute sequentially the acoustic coupling suppressing for each of the false acoustic signals.

Such configurations and processing allow for performing voice enhancement and communication at the same time. Additionally, the voice enhancement/communication system can be realized in a simple configuration just as with the sound enhancement system and the communication system, as described above, and the system configuration can also be flexibly optimized. In addition, in such a voice enhancement/communication system, the master sound emitting and collecting apparatus can also be used to collect and emit sound.

In the aforementioned description, the sound emitting signal Mout is formed by mixing each of the sound input beam signals MB1 to MBn, however, the sound input beam signals MB1 to MBn having been subjected to the acoustic coupling suppressing may also be output unchanged.

In this case, the acoustic coupling suppression section 14 includes the plurality of acoustic coupling cancellers 140A to 140N.

Figure 15:
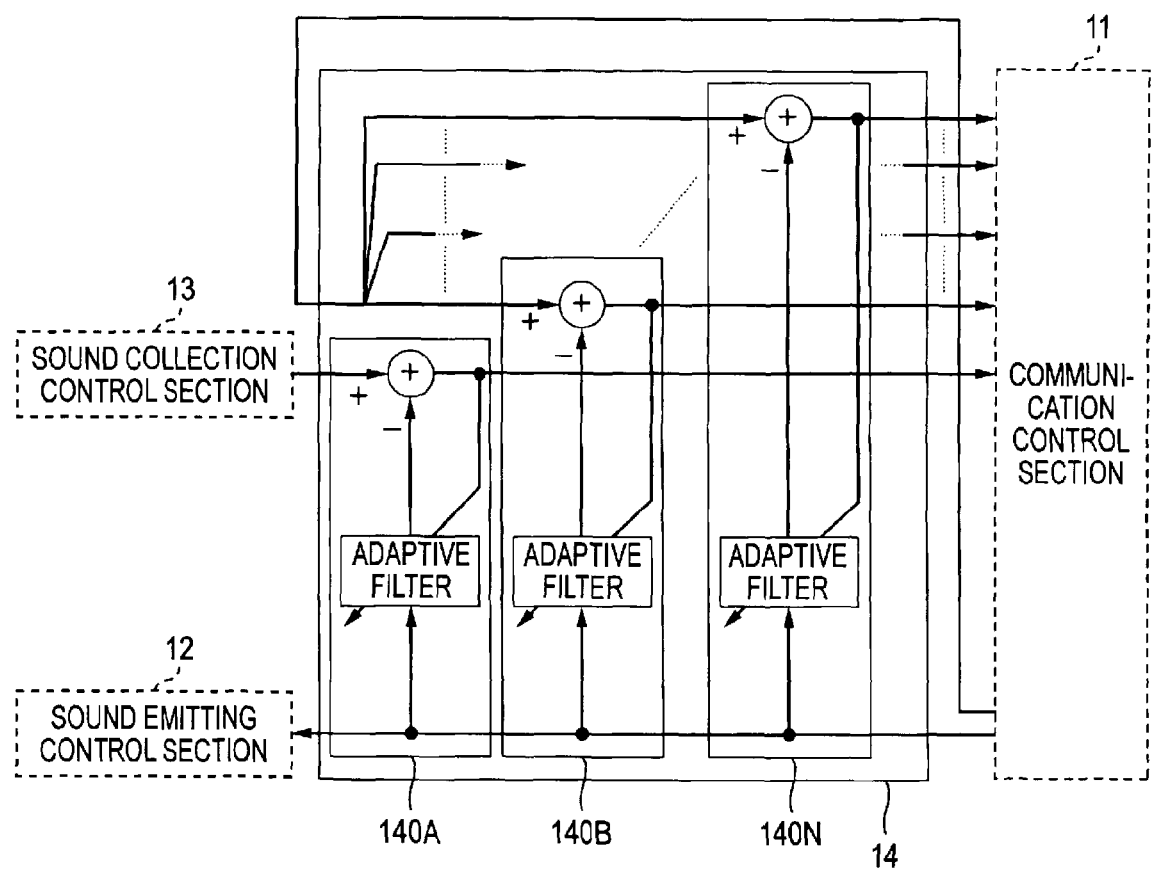
FIG. 15 is a block diagram illustrating main components of another aspect of the acoustic coupling suppression section 14.

FIG. 15 is a block diagram illustrating the main components of another mode of the acoustic coupling suppression section 14.

As shown in FIG. 15, the acoustic coupling cancellers 140A to 140N provided are equal in number to the sound input beam signals to be input to the acoustic coupling suppression section 14. Each of the acoustic coupling cancellers 140A to 140N includes an adaptive filter and an adder, performs the aforementioned acoustic coupling canceling on the sound input beam signals input, and produces individual sound emitting signals. The individual sound emitting signals produced in this manner are grouped while being associated with the identification information of the sound emitting and collecting apparatus that has originally collected the sound, and then output to the communication control section 11 as one group of sound emitting signals. In this configuration, individual acoustic coupling canceling is performed for each sound input beam signal, thereby providing improved effects of acoustic coupling suppressing. In this case, since each individual sound emitting signal associated with the identification information of the sound emitting and collecting apparatus is processed and transmitted, the amount of resources required for the entire system increases, but it is possible to identify the sound emitting and collecting apparatus that has originally collected sound. Accordingly, the master sound emitting and collecting apparatus adds a sound input apparatus identification ID to a group sound output signal when output to the transmission line LT, thereby allowing more detailed sound emission settings to be made to each of the slave sound emitting and collecting apparatuses. For example, upon emission of sound, only the slave sound emitting and collecting apparatus that has originally collected sound can be set so as not to emit sound.

In addition, the number of sound emitting and collecting apparatuses and the number of sound input beam signals are used by way of example in each of the aforementioned descriptions, and thus may be defined appropriately, depending on the specifications of the system. The present invention is based on Japanese patent application No. 2007-261897 filed on Oct. 5, 2007, the contents of which are incorporated herein by reference.

The invention claimed is:

1. A sound processing system comprising:
   a plurality of sound emitting and collecting apparatuses, each of which includes a sound collecting section, a sound emitting section, and an acoustic coupling suppressing section; and
   communication lines serially connecting the plurality of sound emitting and collecting apparatuses together so that the plurality of sound emitting and collecting apparatuses communicate with each other via a multi-channel communication protocol,
   wherein one of the plurality of sound emitting and collecting apparatuses is set as a master sound emitting and collecting apparatus, and the other apparatuses remaining among the plurality of sound emitting and collecting apparatuses are set as slave sound emitting and collecting apparatuses,
   wherein the master sound emitting and collecting apparatus produces a synchronization signal and outputs the synchronization signal to each of the slave sound emitting and collecting apparatuses,
   wherein the sound collecting section of each of the slave sound emitting and collecting apparatuses produces a collection sound signal in synchronization with the synchronization signal,
   wherein the master sound emitting and collecting apparatus acquires the collection sound signal from each of the slave sound emitting and collecting apparatuses, executes acoustic coupling suppressing process to the acquired collection sound signal by the acoustic coupling suppressing section to produce a sound emitting signal, and then outputs the sound emitting signal to each of the slave sound emitting and collecting apparatuses, and
   wherein the sound emitting section of each of the slave sound emitting and collecting apparatuses emits the sound emitting signal output by the master sound emitting and collecting apparatus in synchronization with the synchronization signal.

2. The sound processing system according to claim 1, wherein the acoustic coupling suppressing section of the master sound emitting and collecting apparatus mixes acquired collection sound signals, and executes the acoustic coupling suppressing process to the mixed combined collection sound signal.

3. The sound processing system according to claim 1, wherein the acoustic coupling suppressing section of the master sound emitting and collecting apparatus executes the acoustic coupling suppressing process to each of the acquired collection sound signals individually, and then mixes the processed collection sound signals to produce and output the sound emitting signal to each of the slave sound emitting and collecting apparatuses.

4. The sound processing system according to claim 1, wherein:
   each of the slave sound emitting and collecting apparatuses adds an associated sound collection apparatus ID to the collection sound signal to be output to the master sound emitting and collecting apparatus,
   the master sound emitting and collecting apparatus executes the acoustic coupling suppressing process to each of the acquired collection sound signals individually and then outputs the sound emitting signals associated with the sound collection apparatus IDs respectively, and
   each of the slave sound emitting and collecting apparatuses performs sound emitting process on the sound emitting signal based on the sound collection apparatus ID.

5. The sound processing system according to claim 1, wherein the master sound emitting and collecting apparatus executes the acoustic coupling suppressing process to a plurality of collection sound signals including an collection sound signal to be emitted from the master sound emitting and collecting apparatus and the collection sound signals acquired from each of the slave sound emitting and collecting apparatuses.

6. The sound processing system according to claim 1, wherein the sound emitting section of the master sound emitting and collecting apparatus emits the sound emitting signal.

7. The sound processing system according to claim 1, wherein the master sound emitting and collecting apparatus includes an external network connection terminal and transmits the sound emitting signal from the external network connection terminal.

8. The sound processing system according to claim 7, wherein the master sound emitting and collecting apparatus executes the same processing as for the collection sound signal on a network received sound signal received through the external network connection terminal.

9. A sound processing system comprising:
   a master apparatus; and
   a plurality of slave apparatuses serially connected together and serially connected to the master apparatus via communication lines so that the plurality of slave apparatuses all communicate with each other and with the master apparatus via a multi-channel communication protocol,
   wherein the master apparatus includes an acoustic coupling suppressing section,
   wherein each of the slave apparatus includes a sound collecting section and a sound emitting section,
   wherein the master apparatus produces a synchronization signal and outputs the synchronization signal to each of the slave apparatuses,
   wherein the sound collecting section of each of the slave apparatus produces a collection sound signal in synchronization with the synchronization signal,
   wherein the master apparatus acquires the collection sound signal from each of the slave apparatuses, executes acoustic coupling suppressing process to the acquired collection sound signals by the acoustic coupling suppressing section to produce a sound emitting signal, and then outputs the sound emitting signal to each of the slave apparatuses, and
   wherein the sound emitting section of each of the slave apparatuses emits the sound emitting signal output by the master apparatus.

10. The sound processing system according to claim 1, wherein the multi-channel communication protocol is one of mLAN, CorbraNet, or EtherSound.

11. The sound processing system according to claim 9, wherein the multi-channel communication protocol is one of mLAN, CorbraNet, or EtherSound.

* * * * *